US011943355B2

(12) United States Patent
Freeman et al.

(10) Patent No.: US 11,943,355 B2
(45) Date of Patent: Mar. 26, 2024

(54) DECENTRALIZED SYSTEM AND METHOD FOR MITIGATION OF CLIMATE CHANGE

(71) Applicant: Hunt Energy Enterprises, L.L.C., Dallas, TX (US)

(72) Inventors: Ross E. Freeman, Garland, TX (US); Victor Kuang-en Liu, Richardson, TX (US); Mark H. Griffin, Dallas, TX (US); Robert D. Maher, III, Frisco, TX (US); John F. Allen, Jr., Houston, TX (US)

(73) Assignee: Hunt Energy Enterprises, L.L.C., Dallas, TX (US)

( * ) Notice: Subject to any disclaimer, the term of this patent is extended or adjusted under 35 U.S.C. 154(b) by 0 days.

(21) Appl. No.: 17/817,081

(22) Filed: Aug. 3, 2022

(65) Prior Publication Data

US 2024/0048383 A1 Feb. 8, 2024

(51) Int. Cl.
*H04L 9/32* (2006.01)
*G06Q 20/36* (2012.01)
*H04L 9/00* (2022.01)

(52) U.S. Cl.
CPC ......... *H04L 9/3213* (2013.01); *G06Q 20/363* (2013.01); *H04L 9/50* (2022.05); *H04L 2209/463* (2013.01)

(58) Field of Classification Search
CPC ... H04L 9/3213; H04L 9/50; H04L 2209/463; G06Q 20/363
See application file for complete search history.

(56) References Cited

U.S. PATENT DOCUMENTS

| | | | |
|---|---|---|---|
| 9,836,790 B2 | 12/2017 | Ronca et al. | |
| 9,979,718 B2 | 5/2018 | Kurian | |
| 10,127,552 B2 | 11/2018 | Ronca et al. | |
| 10,742,313 B1* | 8/2020 | Favarolo | G06F 9/505 |
| 11,238,474 B2 | 2/2022 | Price et al. | |
| 11,238,964 B2 | 2/2022 | Sharif | |
| 11,244,396 B2 | 2/2022 | Singh et al. | |
| 2017/0048234 A1* | 2/2017 | Lohe | H04L 63/061 |
| 2017/0103468 A1* | 4/2017 | Orsini | H04L 9/3239 |
| 2018/0088928 A1* | 3/2018 | Smith | H04L 9/3239 |
| 2018/0197172 A1* | 7/2018 | Coburn | H04L 9/0637 |
| 2018/0299852 A1* | 10/2018 | Orsini | G06Q 50/06 |

(Continued)

*Primary Examiner* — Taghi T Arani
*Assistant Examiner* — Blake I Narramore
(74) *Attorney, Agent, or Firm* — Baker Botts L.L.P.

(57) ABSTRACT

Methods and compositions for decentralized systems for mitigating climate change are provided. In some embodiments, the compositions comprise: one or more first servers operable to store a plurality of first tokens, wherein each one of the plurality of first tokens is associated with fiscal value; one or more second servers operable to store a plurality of second tokens, wherein each one of the plurality of second tokens corresponds to a unit of voting power; one or more project developer nodes operable to transmit project data corresponding to renewable energy or carbon sequestration; one or more auditor nodes operable to verify an identity, validate credentials, perform a project assessment, generate a smart contract, receive signals, and transmit signals; and one or more steward nodes, wherein each one of the one or more steward nodes is operable to stake tokens for voting power and to distribute voting power.

10 Claims, 11 Drawing Sheets

(56) References Cited

U.S. PATENT DOCUMENTS

| | | | |
|---|---|---|---|
| 2019/0057396 A1* | 2/2019 | Cui | G06Q 30/018 |
| 2020/0027096 A1* | 1/2020 | Cooner | G06Q 40/04 |
| 2020/0051076 A1* | 2/2020 | Cichocki | H04L 9/50 |
| 2022/0237628 A1* | 7/2022 | Wollack | H04L 9/50 |

* cited by examiner

| | Overview | Development Status | Operations & Maintenance | Finance Details |
|---|---|---|---|---|
| Name | Project Name | | | |
| | | Location | | |
| | | Lat, Long, Country, State, County | Technology | Racking Type, Module Type (c-Si, CdTe, CIGS) |
| Nameplate Capacity | kW (DC) | | | |
| | | Power Market | Operational Status | |
| | | CAISO, ERCOT, PJM, ISO-NE, MISO | Active, Pending, Target Date | |
| Funding Requested | $ | Capital Costs | | |
| | | Total Installed Cost | Production Year 1 | kWh |

DECENTRALIZED SYSTEM AND METHOD FOR MITIGATION OF CLIMATE CHANGE

TECHNICAL FIELD

The present disclosure relates to decentralized autonomous organizations, and more particularly, to using virtual currency to realize the demand for energy transition and to mitigate climate change.

BACKGROUND

To date, virtual currency systems have demonstrated a new type of network business model, but such cryptocurrency systems have had a predominantly negative effect on climate change, and those designed to mitigate climate change are limited in nature. For example, proof-of-work systems like Bitcoin harm the environment by wasting energy. Even when renewable energy is used to mine proof-of-work currencies, the opportunity cost is significant, as the lost energy could have been used for less speculative applications. Still other climate-friendly virtual currency systems focus on creating a voluntary and privatized carbon credit market; however, these climate-friendly virtual currency systems are limited in nature.

Global demand for green investment has reached an all-time high. Governments have attempted to address climate change through several measures, including restrictions on high-emissions activities, investments in renewable energy, and financial incentives through carbon credits; however, these methods have had limited success. Individual climate advocates have acted to mitigate global warming as well by supporting climate-friendly businesses and adjusting high-emission behaviors (such as transportation), among other efforts, but individual efforts remain insufficient; a global mass of parties must be incentivized to cooperate in a market fashion to sufficiently reduce emissions. Existing climate-friendly cryptocurrency systems have failed to create a global mass of cooperating parties.

SUMMARY

Climate-friendly cryptocurrency systems must economically motivate parties to join in the network business model. One example embodiment may take the form of an open, decentralized network that incentivizes members to contribute to the growth of a low-cost, productive energy network. One or more of cryptocurrency, blockchain, smart contracts, and other technologies may be used to monitor, authenticate, and/or manage the network. Thus, a low-cost, decentralized network may grow and create high-performance infrastructure and technology. Productivity and network growth may create a recursive value-building effect; as one increases, a positive feedback loop may form, thereby allowing the other to increase. Cryptocurrency prices and values may correlate with the increasing productive value of the network, thereby stimulating further investment in infrastructure and technology, which in turn may further increase the network's value. Certain climate change technologies (for example, and without limitation, direct air capture) may generally be considered unaffordable until the future; however, an increasing clean energy cryptocurrency value would allow such climate change technologies to become affordable in the present. Thus, a clean energy network business model may provide a means by which future innovations may be presently valued, thereby motivating investors, speculators, and other participants to join in the clean energy network business model. As the network's infrastructure is built out, its increasing clean energy production may undergird the network economy's growth and corresponding currency.

Accordingly, embodiments of the present disclosure are generally directed to decentralized autonomous organizations ("DAO" or "DAOs"), and more particularly, to using virtual currency to realize the demand for energy transition and to mitigate climate change. The systems and methods disclosed herein may be used to bolster climate change mitigation efforts by promoting investments in carbon offsets and renewable energy. The present disclosure's democratized DAO allows entities to invest in and vote to approve carbon-mitigating projects through a novel voting algorithm and role-based node structure. An autonomous computer system may operate in a peer-to-peer network to ensure security and to preserve an egalitarian, democratized structure. In certain embodiments, smart contracts may be utilized to manage projects undertaken by a DAO and to award entities within a DAO (for example, and without limitation, project developers). In certain embodiments, democratized voting systems corresponding to a role-based node structure may incentivize ethical and efficient behavior within the DAO. Capital may be built and preserved through one or more coin offerings and/or by reinvesting returns from projects undertaken by a DAO. In certain embodiments, voting tokens ("VT") may be granted to entities in return for staking virtual tokens, and financial incentives may be granted for voting.

The present disclosure embodies several unique advantages. For example, certain embodiments incorporate one or more auditing, assessment, and/or validation functions into a DAO structure. Moreover, governance voting mechanisms (such as quadradic voting and/or conviction voting) may be used to project approval and funding. Furthermore, the present disclosure's voting algorithm and collection of unique roles allow for the creation of a highly organized, non-plutocratic DAO capable of voting on and approving climate-friendly projects. These and other advantages of the systems and methods of the present disclosure may incentivize investment in climate change mitigation.

Embodiments of the present disclosure are generally directed to a decentralized system for mitigating climate change. In some non-limited embodiments, a decentralized system includes one or more first servers operable to store a plurality of first tokens, wherein each one of the plurality of first tokens is associated with fiscal value. The decentralized system further includes one or more second servers operable to store a plurality of second tokens, wherein each one of the plurality of second tokens corresponds to a unit of voting power. The decentralized system further includes one or more project developer nodes operable to transmit project data associated with a project corresponding to one or more of renewable energy and carbon sequestration. The decentralized system further includes one or more auditor nodes operable to verify an identity associated with one or more project developer wallets based at least in part on identity information provided within the project data. The auditor nodes are further operable to validate credentials associated with the one or more project developer wallets based at least in part on credential information provided within the project data. The auditor nodes are further operable to perform a project assessment on the project associated with the project data based at least in part on one or more factors. The auditor nodes are further operable to generate a smart contract based at least in part on the project data. The decentralized system further includes one or more validator nodes operable to receive a first signal indicating the verified identity and/or the validated credentials associated with the one or more project developer wallets. The validator nodes are further operable to receive a second signal comprising the project assessment and/or the generated smart contract. The validator nodes are further operable to transmit the verified identity associated with the one or more project developer wallets, the validated credentials associated with the one or more project developer wallets, the project assessment, the generated smart contract, or a combination thereof to a blockchain database. The decentralized system further includes one or more steward nodes, wherein each one of the one or more steward nodes is operable to stake at least one second token for a unit of voting power and to assign the unit of voting power to the project. Each of the one or more first servers, the one or more second servers, the one or more steward nodes, the one or more auditor nodes, the one or more project developer nodes, and the one or more validator nodes are communicatively coupled to each other via a communication network.

In some non-limiting embodiments, each one of the one or more steward nodes is further operable to receive and store one or more first tokens from the one or more first servers. In some non-limiting embodiments, each one of the one or more steward nodes is further operable to transmit one or more first tokens to the one or more second servers. In some non-limiting embodiments, each one of the one or more steward nodes is further operable to receive and store one or more second tokens from the one or more second servers in response to the transmission of the one or more first tokens to the one or more second servers.

In some non-limiting embodiments, each one of the one or more auditor nodes is further operable to verify an identity associated with at least one steward wallet based at least in part on identity information provided by the one or more steward nodes. In some non-limiting embodiments, each one of the one or more auditor nodes is further operable to designate the verified one or more steward nodes as one or more representative nodes.

In some non-limiting embodiments, the one or more representative nodes are operable to assign one or more units of voting power associated with the one or more steward nodes to the project.

In some non-limiting embodiments, the decentralized system further comprises one or more protocol developer nodes operable to generate one or more software protocol changes to the decentralized system.

In some non-limiting embodiments, the decentralized system further comprises one or more governor nodes operable to propose one or more software protocol changes to the decentralized system. In some non-limiting embodiments, the one or more governor nodes are operable to send a request to the one or more protocol developer nodes to generate the one or more software protocol changes based at least in part on a threshold consensus.

In some non-limiting embodiments, the one or more factors for performing the project assessment include one or more of project expected success, cost, return rate, utility score, and a value to the community.

In some non-limiting embodiments, the one or more first servers are operable to transmit one or more of the first tokens to the one or more project developer wallets based at least in part on execution of the generated smart contract.

In some non-limiting embodiments, the one or more first servers are operable to transmit one or more first tokens to one or more auditor wallets in response to the one or more auditor nodes verifying the identity associated with the one or more project developer wallets or validating the credentials associated with the one or more project developer wallets.

In some non-limiting embodiments, at least one of the one or more first servers and at least one of the one or more second servers operate on a same processor and memory.

In some non-limiting embodiments, a quantity of the plurality of first tokens is minted based at least in part on one or more of an amount of greenhouse gases stored and an amount of energy produced.

In some non-limiting embodiments, a quantity of one or more of the one or more first servers, the one or more second servers, the one or more steward nodes, the one or more auditor nodes, the one or more project developer nodes, and the one or more validator nodes is added to the decentralized system based at least in part on one or more of an amount of greenhouse gases stored and an amount of energy produced.

In some non-limiting embodiments, one or more wallets comprise one or more of a wallet processor and a wallet memory.

In some non-limiting embodiments, the decentralized system further comprises one or more private keys associated with one or more wallets, and the one or more private keys may be used to increase the cryptographic security of one or more of sending, receiving, and spending virtual tokens.

Other embodiments of the present disclosure are directed at a method of determining a project for climate change through a decentralized system. In some non-limiting embodiments, the method includes transmitting project data associated with a project corresponding to one or more of renewable energy and carbon sequestration to a communication network. The method further includes verifying an identity associated with one or more project developer wallets based at least in part on identity information provided within the project data. The method further includes validating credentials associated with the one or more project developer wallets based at least in part on credential information provided within the project data. The method further includes performing a project assessment on the project associated with the project data based at least in part on one or more factors. The method further includes generating a smart contract based at least in part on the project data. The method further includes assigning one or more units of voting power to the project. The method further includes executing the generated smart contract in response to exceeding a voting threshold.

In some non-limiting embodiments, the one or more factors for performing the project assessment include one or more of project expected success, cost, return rate, utility score, and a value to the community.

In some non-limiting embodiments, the method further includes transmitting one or more virtual tokens to the one or more project developer wallets based at least in part on execution of the generated smart contract.

In some non-limiting embodiments, the method further includes generating a first non-fungible indicator associated with the one or more project developer wallets in response to verifying the identity associated with the one or more project developer wallets.

In some non-limiting embodiments, the method further includes generating a second non-fungible indicator associated with the one or more project developer wallets in response to validating the credentials associated with the one or more project developer wallets.

In some non-limiting embodiments, the method further includes transmitting one or more virtual tokens to one or more auditor node wallets in response to verifying the identity associated with the one or more project developer wallets or validating the credentials associated with the one or more project developer wallets.

In some non-limiting embodiments, the method further includes verifying an identity associated with one or more steward wallets based at least in part on identity information provided by one or more steward nodes. In some non-limiting embodiments, the method further includes designating the verified one or more steward nodes as one or more representative nodes.

In some non-limiting embodiments, the method further includes assigning, by the one or more representative nodes, one or more units of voting power associated with the one or more steward nodes to the project.

In some non-limiting embodiments, the method further includes generating one or more software protocol changes to the decentralized system in response to exceeding a threshold consensus.

In some non-limiting embodiments, the method further includes minting a quantity of virtual tokens based at least in part on one or more of an amount of greenhouse gases stored and an amount of energy produced.

In some non-limiting embodiments, one or more wallets comprise one or more of a wallet processor and a wallet memory.

In some non-limiting embodiments, one or more wallets are associated with one or more private keys, and the one or more private keys may be used to increase the cryptographic security of one or more of sending, receiving, and spending virtual tokens.

Other embodiments of the present disclosure are directed at a non-transitory computer-readable medium having instructions that are configured, when executed by a processor, to receive project data associated with a project corresponding to one or more of renewable energy and carbon sequestration from a communication network. In some non-limiting embodiments, the instructions are further configured, when executed by a processor, to verify an identity associated with one or more project developer wallets based at least in part on identity information provided within the project data. The instructions are further configured, when executed by a processor, to validate credentials associated with the one or more project developer wallets based at least in part on credential information provided within the project data. The instructions are further configured, when executed by a processor, to perform a project assessment on the project associated with the project data based at least in part on one or more factors. The instructions are further configured, when executed by a processor, to generate a smart contract based at least in part on the project data. The instructions are further configured, when executed by a processor, to assign one or more units of voting power to the project. The instructions are further configured, when executed by a processor, to execute the generated smart contract in response to exceeding a voting threshold.

In some non-limiting embodiments, the instructions are further configured, when executed by a processor, to transmit one or more virtual tokens to the one or more project developer wallets based at least in part on execution of the generated smart contract.

In some non-limiting embodiments, the instructions are further configured, when executed by a processor, to generate a first non-fungible indicator associated with the one or more project developer wallets in response to verifying the identity associated with the one or more project developer wallets.

In some non-limiting embodiments, the instructions are further configured, when executed by a processor, to generate a second non-fungible indicator associated with the one or more project developer wallets in response to validating the credentials associated with the one or more project developer wallets.

In some non-limiting embodiments, the instructions are further configured, when executed by a processor, to transmit one or more virtual tokens to one or more auditor wallets in response to verifying the identity associated with the one or more project developer wallets or validating the credentials associated with the one or more project developer wallets.

In some non-limiting embodiments, the instructions are further configured, when executed by a processor, to generate one or more software protocol changes to a decentralized system in response to exceeding a threshold consensus.

In some non-limiting embodiments, the one or more factors for performing the project assessment include one or more of project expected success, cost, return rate, utility score, and a value to the community.

In some non-limiting embodiments, a quantity of virtual tokens is minted based at least in part on one or more of an amount of greenhouse gases stored and an amount of energy produced.

In some non-limiting embodiments, one or more wallets comprise one or more of a wallet processor and a wallet memory.

In some non-limiting embodiments, one or more wallets are associated with one or more private keys, and the one or more private keys may be used to increase the cryptographic security of one or more of sending, receiving, and spending virtual tokens.

Other embodiments of the present disclosure are directed at a system. In some non-limiting embodiments, the system includes a memory operable to store project data associated with a project and one or more virtual tokens, the project corresponding to one or more of renewable energy and carbon sequestration. The system further includes a processor communicatively coupled to the memory and operable to generate a smart contract based at least in part on the project data. The processor is further operable to assign one or more units of voting power to the project. The processor is further operable to execute the generated smart contract in response to exceeding a voting threshold. The processor is further operable to determine a value of each virtual token such that an increase in energy produced and/or carbon sequestered results in an increase of the value of each virtual token. The processor is further operable to transmit the determined value to a user.

In some non-limiting embodiments, the processor is further operable to generate one or more software protocol changes to a decentralized system in response to exceeding a threshold consensus.

In some non-limiting embodiments, the processor is further operable to verify an identity associated with one or more project developer wallets based at least in part on identity information provided within the project data. In some non-limiting embodiments, the processor is further operable to validate credentials associated with the one or more project developer wallets based at least in part on credential information provided within the project data. In some non-limiting embodiments, the processor is further operable to perform a project assessment on the project associated with the project data based at least in part on one or more factors.

In some non-limiting embodiments, the processor is further operable to transmit one or more virtual tokens to the one or more project developer wallets based at least in part on execution of the generated smart contract.

In some non-limiting embodiments, the processor is further operable to generate a first non-fungible indicator associated with the one or more project developer wallets in response to verifying the identity associated with the one or more project developer wallets.

In some non-limiting embodiments, the processor is further operable to generate a second non-fungible indicator associated with the one or more project developer wallets in response to validating the credentials associated with the one or more project developer wallets.

In some non-limiting embodiments, the processor is further operable to transmit one or more virtual tokens to one or more auditor wallets in response to verifying the identity associated with the one or more project developer wallets or validating the credentials associated with the one or more project developer wallets.

In some non-limiting embodiments, the one or more factors for performing the project assessment include one or more of project expected success, cost, return rate, utility score, and a value to the community.

In some non-limiting embodiments, one or more wallets comprise one or more of a wallet processor and a wallet memory.

In some non-limiting embodiments, the decentralized system further comprises one or more private keys associated with one or more wallets, and the one or more private keys may be used to increase the cryptographic security of one or more of sending, receiving, and spending virtual tokens.

These and other features and characteristics of the disclosed systems and methods for decentralized autonomous organizations will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular forms of "a", "an", and "the" include plural referents unless the context clearly dictates otherwise.

BRIEF DESCRIPTION OF THE DRAWINGS

For a more complete understanding of the present disclosure and its features and advantages, reference is now made to the following description, taken in conjunction with the accompanying drawings, in which:

FIGS. 8A-8D are example user interfaces for DAO project management, according to one or more embodiments.

DETAILED DESCRIPTION

Figure 1:
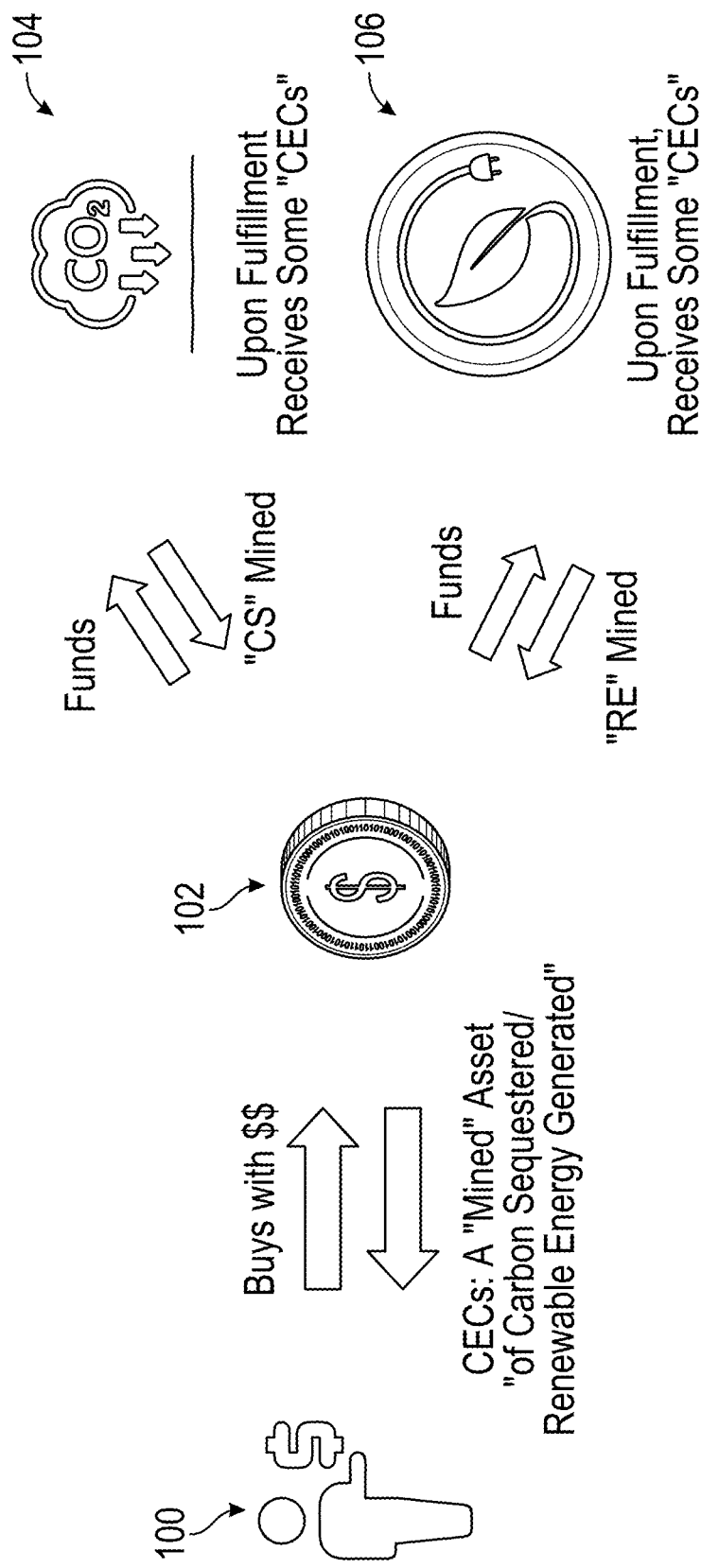
FIG. 1 is a flow chart illustrating a method for distributing a digital currency in exchange for fiat currency or desirable actions by DAO personnel, according to one or more embodiments.

For purposes of the description hereinafter, it is to be understood that the disclosure may assume alternative variations and step sequences, except where expressly specified to the contrary. It is also to be understood that the specific devices and processes illustrated in the attached drawings and described in the following specification are simply exemplary aspects of the disclosure. Hence, specific dimensions and other physical characteristics related to the aspects disclosed herein are not to be considered as limiting.

As used herein, the term "coupled" should be understood to include any connection between two things, including, and without limitation, a physical connection (including, and without limitation, a wired or mechanical connection), a non-physical connection (including, and without limitation, a wireless connection), or any combination thereof. Furthermore, the words "comprising" (and any form of comprising, such as "comprise" and "comprises"), "having" (and any form of having, such as "has" and "have"), "including" (and any form of including, such as "includes" and "include") or "containing" (and any form of containing, such as "contains" and "contain") are to be understood as inclusive and open-ended and do not exclude additional, unrecited elements or method steps. Additionally, terms indicating a DAO role followed by the word "wallet" (for example, and without limitation, "project developer wallet(s)", "auditor wallet(s)", and "steward wallet(s)") should be understood to denote a virtual wallet owned by an entity (that is, an individual or organization) acting as the denoted role. For example, and without limitation, the term "one or more project developer wallets" is to be understood as having the same meaning as "one or more virtual wallets owned by one or more entities acting as one or more project developers." It is to be understood that a single entity may take on multiple roles; accordingly, a single wallet may be associated with multiple roles. Furthermore, as used herein, the term "wallet" refers to a virtual wallet having software elements, hardware elements, or any combination thereof.

As used herein, the term "at least one of" is synonymous with "one or more of." For example, the phrase "at least one of A, B, and C" means any one of A, B, and C, or any combination of any two or more of A, B, and C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of." For example, the phrase "at least two of D, E, and F" means any combination of any two or more of D, E, and F. For example, "at least two of D, E, and F" includes one or more of D and one or more of E;

or one or more of D and one or more of F; or one or more of E and one or more of F; or one or more of all of D, E, and F.

FIG. 1 is a flow chart illustrating an example method for distributing a digital currency in exchange for fiat currency or desirable actions by DAO personnel, according to one or more embodiments. FIG. 1 shows virtual tokens 102 being acquired in three exemplary ways. First, a quantity of virtual tokens 102 may be acquired in exchange for a currency (for example, and without limitation, U.S. dollars, other fiat currency, or other virtual tokens). Second, a quantity of virtual tokens 102 may be acquired in exchange for the performance of a desirable action. FIG. 1 depicts carbon sequestration ("CS") 104 or carbon mitigation 106 as the desirable action, but other desirable actions may be rewarded without departing from the scope of the present disclosure. Third, a quantity of virtual tokens 102 may be acquired in exchange for the performance of an alternative desirable action; in this case, production of renewable energy ("RE") 106. FIG. 1 shows Clean Energy Coins (CECs) being received as the virtual tokens 102, but the methods disclosed herein may apply to any virtual tokens. Though FIG. 1 shows only three means by which virtual tokens may be acquired, those skilled in the relevant art will understand that any means of acquiring virtual tokens may be used without departing from the scope of the present disclosure. For example, in certain embodiments, tokens may be received by performing actions useful to one or more functions of the DAO. For example, and without limitation, examples include: (1) processing transactions; (2) facilitating smart contracts; (3) voting and/or other decision making; (4) assessing projects; and (5) providing protocol support.

CS 104 is an example process by which carbon dioxide (or other greenhouse gasses) are pulled from the atmosphere and stored in the earth to slow (or even reverse) climate change. RE 106 is the production of energy with either zero or near-zero greenhouse gas emissions. Though FIG. 1 shows only two desirable actions by which virtual tokens 102 may be acquired, those skilled in the relevant art will understand that any desirable action may be rewarded by the DAO without departing from the scope of the present disclosure. These include, but are not limited to, such actions as the support and encouragement of (1) improved carbon capture technologies; (2) carbon re-use technologies (including, and without limitation, GHG batteries and waste-to-energy), (3) renewable energy technologies (including direct carbon mitigation techniques (such as improved solar radiation capture efficiency or reduced transfer loss) and indirect carbon mitigation techniques (such as increased solar-power equipment durability, longevity, and/or usage)), and (4) other carbon mitigation techniques (including, and without limitation, the removal and/or replacement of GHG-producing substances, such as petcoke). In certain embodiments, virtual tokens 102 may be exchanged for CS 104, RE 106, or other desirable actions through smart contracts. A smart contract is a contract wherein code is used to render one or more terms of the contract as self-executing. The number of virtual tokens acquired in exchange for currency 100, CS 104, or RE 106 need not be an integer; rather, any quantity of virtual tokens (including fractions less than or exceeding one token) may be received. In certain embodiments, the process of FIG. 1 may be used in a DAO.

Figure 2:
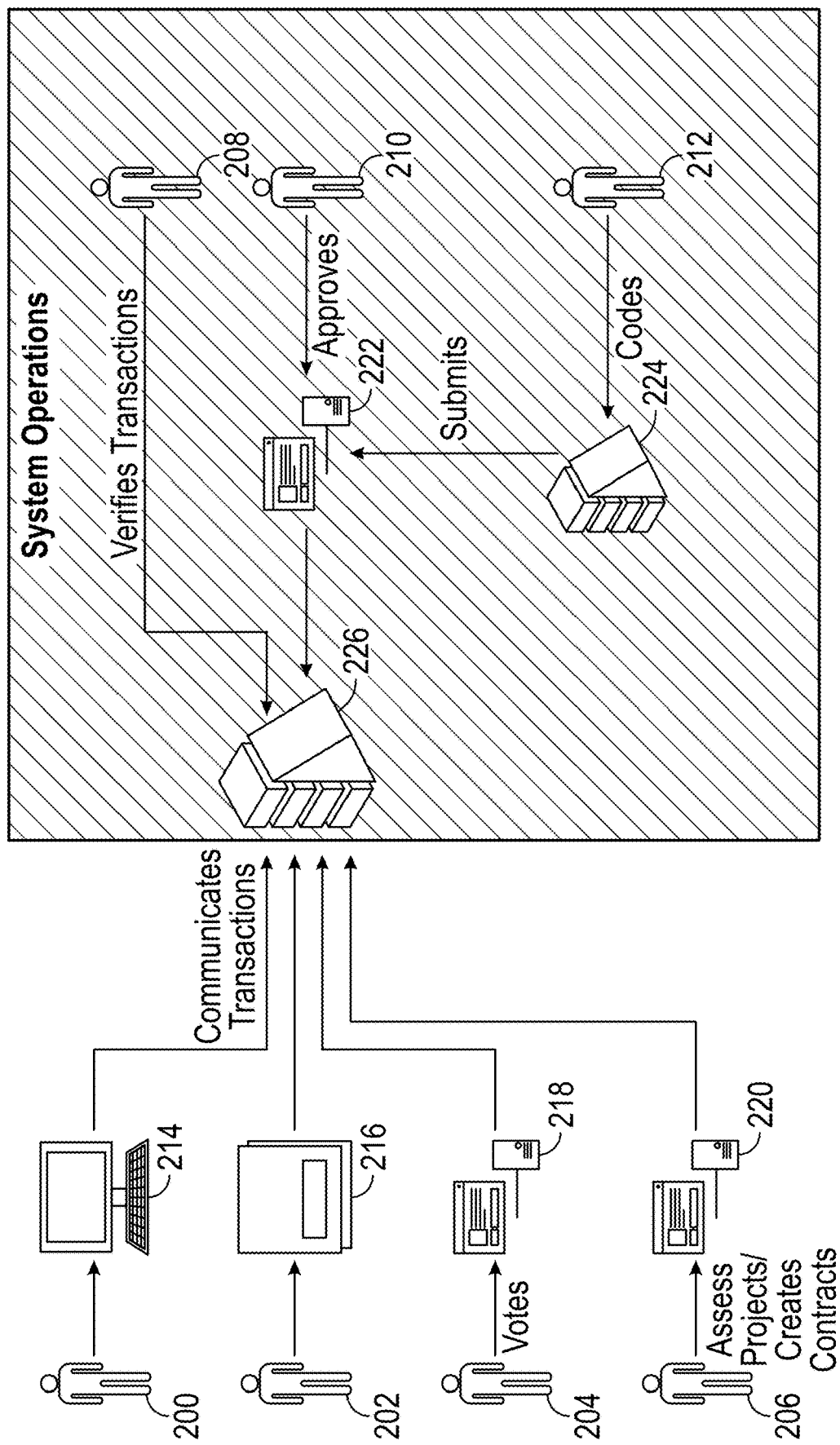
FIG. 2 is a flow chart illustrating a method for delineating roles within a DAO, according to one or more embodiments.

FIG. 2 is a flow chart illustrating a method for delineating roles within a DAO, according to one or more embodiments. A master node 226 may process transactions in several ways. In certain embodiments, a trader 200 may enter into transactions involving virtual tokens 102 through the use of a virtual wallet 214. In certain embodiments, a project developer 202 may file a new project form 216 to request that a new project be funded by the DAO. In certain embodiments, a steward 204 or representative may vote using a project voting application 218 to determine whether the DAO should fund a project. In certain embodiments an auditor 206 may verify the identity and/or credentials of a project developer, auditor, steward, and/or representative. In certain embodiments, an auditor 206 may assess a requested project and/or create a contract 220 (for example, and without limitation, a smart contract). In certain embodiments, an auditor 206 may also provide identity verification, credential verification, and/or project output verification services. The examples provided in this paragraph are purely exemplary; the master node 226 may process any transactions within the scope of a DAO.

Traders 200, project developers 202, stewards 204, representatives, and auditors 206 may enter into transactions with the master node 226 to allow the DAO to function. Similarly, validators 208, governors 210, and protocol developers 212 may perform system operations to support the master node 226. FIG. 2 shows the delineation between system-operations roles and other roles within the DAO via a hashed background. In certain embodiments, a validator 208 may verify one or more transactions. In certain embodiments, a protocol developer 212 may code one or more new protocols on a test node 224. In certain embodiments, a governor 210 may use a protocol voting application 222 to authorize the development of a new protocol. Upon approval by a governor 210, the new protocol may be migrated from the test node 224 to the master node 226. In any of the operations shown in FIG. 2, one or more entities may work together to perform an action (for example, and without limitation, two or more governors 210 may vote as to whether to approve a new protocol).

In certain embodiments, one or more distributed applications may be used within the processes shown in FIG. 2. For example, and without limitation, a new project form 216, a project voting application 218, a contract application 220, and/or a protocol voting application may be a distributed application. A distributed application is an application that runs on two or more computers within a network. A distributed application may be stored on servers and/or via cloud computing. A digital application (that is, software) is an application that runs on one or more computers. A distributed application is a form of digital application.

The present application explicitly discloses no less than ten roles that a member of a DAO may take on: trader 200, project developer 202, steward 204, representative (which is a form of steward 204), auditor 206, validator 208, delegator (which is a form of validator 208 in a manner analogous to the role of a representative as compared to that of a steward 204), governor 210, protocol developer 212, and bounty hunter (not shown). This list is not exclusive; other roles may be incorporated into a DAO without departing from the scope of the present disclosure. Moreover, in certain embodiments, a subset of the roles listed herein may be incorporated into a DAO without incorporating all roles listed herein. A single entity may take on one or more roles. The roles listed in this paragraph are discussed in more detail below.

Trader 200:

Any entity who holds a quantity of virtual tokens may be considered a trader 200. Traders 200 are responsible for moving currency around via exchanges, transactions, or other contracts In certain embodiments, a digital application such as a digital wallet may facilitate these responsibilities.

A digital wallet may be comprised of software, hardware, or any combination thereof. A trader may view its virtual tokens as an investment, a currency, or both.

Project Developer 202:

A project developer 202 is an entity within a DAO that introduces one or more projects in the hopes of gaining funding approval. In certain embodiments, a project developer 202 may use a digital application to submit one or more projects to a DAO. In certain embodiments, a digital application may guide a project developer 202 through the project approval process. In certain embodiments, project developers 202 may be required to pay a fee to support the various tasks associated with the evaluation of the project developer 202, the project, and/or contract formation.

Once a project is submitted by a project developer 202, stewards 204 and/or representatives may review the project and the requested funding and payback contract(s) before voting on the project. If accepted, the project developer 202 may be paid in full once the treasury has the appropriate funds and may be expected to pay back funds per the contract.

Steward 204:

A steward 204 is an entity within a DAO that votes on whether a project should be approved for funding. In certain embodiments, a steward 204 may exchange a quantity of virtual tokens for a quantity of VT, which the steward 204 may use to vote as to whether a project should be approved. In certain embodiments, in exchange for voting on projects, stewards 204 may be paid an interest proportional to their staked VT. In certain embodiments, in exchange for voting on projects, stewards 204 may be paid a proportional yield associated with proceeds from current project returns. Simply holding VT may not be enough to accrue interest and/or yield. Stewards 204 may choose to contract with a representative to vote on their behalf in exchange for a portion of interest and/or yield accrued. Any entity with virtual tokens may become a steward 204 through a voting digital application by exchanging virtual tokens for VT. In certain embodiments, a steward 204 may divest its VT through the same voting digital application.

Representative:

A representative is an entity within a DAO that may vote on projects on behalf of stewards 204. In certain embodiments, a steward 204 may become a representative. In certain embodiments, a representative may be a type of steward 204. In certain embodiments, a representative may receive a portion of the interest/yield accrued by the staked VT of the stewards 204 whom the representative represents. In certain embodiments, a reputation score may be assigned to a representative. The reputation score may be a value that increases when projects voted upon by the representative are approved and/or perform well. Conversely, the reputation score may decrease when projects voted upon by the representative fail to garner approval and/or perform poorly. In certain embodiments, the reputation score may exist within a numerical range—for example, and without limitation, the reputation score may vary between 0 and 2.

In certain embodiments, stewards 204 may choose to become representatives by going through a verification process. A steward 204 may have its identity verified and may have its credentials verified by one or more auditors 206.

Auditor 206:

An auditor 206 is an entity within a DAO that may verify the identity and/or credentials of entities and/or projects. Furthermore, in certain embodiments, an auditor 206 may construct and/or negotiate contracts. In certain embodiments, auditors 206 may vie for work via a staking process. Once approved for a given task, an auditor 206 may verify the identity or credentials of an entity, validate whether a project developer 202 owns property (physical or virtual) or assets it claims to own, and/or provide independent assessment of one or more of a project's plan, viability, and returns. In certain embodiments, an auditor 206 may verify the correctness of assumptions, risks, and/or calculations associated with the proposal.

In certain embodiments, auditors 206 may stake virtual tokens to vie for work. In certain embodiments, an automated system may assess the vying auditors' stakes, reputations, and/or credentials to determine a winning auditor to perform the work of the contract. Auditors 206 may be paid a fee for work performed. If an auditor's work is deemed inadequate by the requester (for example, and without limitation, a project developer 202), then the requester may get back a portion of its funds. If the work is deemed inadequate by the DAO system, then the payment may be withheld until such time as the work becomes adequate or may be returned to the requester. If the work is found to be faulty or incorrect, the auditor 206 may lose its stake.

In certain embodiments, a reputation score may be assigned to an auditor 206. The reputation score may be a value that increases when the auditor 206 successfully completes tasks. Conversely, the reputation score may decrease when the auditor 206 performs tasks inadequately. The reputation score may be impacted by one or more of the correctness of contracts, the completeness of contracts, and feedback from requesters. In certain embodiments, the reputation score may exist within a numerical range—for example, and without limitation, the reputation score may vary between 0 and 2.

In certain embodiments, an auditor 206 may hold credentials showing expertise in a particular field. In certain embodiments, an auditor may have its credentials confirmed by the DAO system. Having these credentials confirmed may increase the likelihood that a given auditor 206 is awarded a contract which utilizes the relevant field's skillset.

Validator 208:

A validator 208 is an entity within a DAO that verifies transactions and/or smart contracts that are added to the blockchain or directed acyclic graph ("DAG"). Validators 208 may operate network and computational hardware (that is, servers) to facilitate the processing of transactions in the system. A validator 208 may be expected to operate system protocols, facilitate digital applications, and install/implement approved system changes. There may be hardware requirements and/or geopolitical requirements for operating a node.

In certain embodiments, each validator 208 may be expected to register its server with all other nodes on the system. In certain embodiments, validators 208 may further be expected to process transactions via a validation staking process in exchange for an interest payment for and operation of the server(s). In certain embodiments, validators 208 may further be expected to process transactions via a validation staking process in exchange for a proportional yield of transaction fees for and operation of the server(s). Realization of a validator's interest may be subject to a confirmation of uptime/availability of the node to facilitate transactions. In certain embodiments, validators 208 may be awarded time slots to add transactions to the Blockchain/DAG. For each correctly added transactions in the awarded time slot, the validator may receive a transaction fee. In certain embodiments, the number of time slots awarded to a validator may be based on the amount staked and/or the number of times transactions were correctly added to the Blockchain/DAG. Realization of a validator's interest may be subject to the reputation (correctness) of the node.

In certain embodiments, a validator 208 or its node may maintain a reputation score associated with its performance based on the realization criteria for its interest. A validator's or node's reputation score may be used by one or more of governors 210, other validators 208, delegates, or other entities within the DAO system. In certain embodiments, any entity may become a validator 208 by (1) setting up a server, (2) installing the requisite software, and (3) being approved for the role. In certain embodiments, more or less requirements may be imposed to become a validator 208.

Delegator:

A delegator is an entity within a DAO that stakes coin in association with a validator 208. In exchange for staking coin, the delegator may be paid a negotiated percentage of the validator's 208 profits proportional to the delegator's staked coin. The validator's 208 reputational score may be used by a trader to determine likely profitable delegation agreements between parties.

Governor 210:

A governor 210 is an entity within a DAO that may operate as the ruling body of the DAO, in a manner similar to that of a member of a board of directors. Governors 210 may propose changes to the system, vote on proposed changes, and facilitate the manifestation of changes via protocol developers 212 through a process known as "Governance." In certain embodiments, governors 210 may be responsible for ensuring the system remains fair, balanced, trusted, and open.

In certain embodiments, requirements may be imposed to become a governor 210. For example, and without limitation, an entity may be required to be an existing member of a DAO before being given the role of governor 210. Furthermore, in certain embodiments, another member of the DAO may need to nominate the proposed governor 210 before the role of governor 210 is assigned. Additionally, existing governors 210 may vote to determine whether another entity becomes a governor 210.

Protocol Developer 212:

A protocol developer 212 is an entity within a DAO that facilitates changes to the DAO's software systems. For example, and without limitation, a protocol developer 212 may facilitate changes to one or more of (1) digital applications which make up the various systems, (2) the templates used within, (3) rates or calculations used within the system, (4) protocols, and (5) other changes. In certain embodiments, protocol developers 212 may be contracted specifically for a given task. In certain embodiments, a protocol developer 212 may be rewarded for providing the best implementation of a proposed change. Changes may be presented to the governance and testing systems for approvals. Once the software changes pass a governance vote for approval, the protocol developer(s) 212 may be paid from the reserve and/or treasury. Validators 208 may then be notified of the new software approved and may be expected to implement the changes. In certain embodiments, there may be no requirements to becoming a protocol developer 212. An entity is especially likely to become a protocol developer 212 without any requirements in the case of open development for rewards. In certain embodiments, proposed changes may be reviewed and approved by governance before a protocol developer 212 acts on the proposed changes; once the change is implemented and tested, governance may approve payment.

Bounty Hunter (not Shown):

A bounty hunter is an entity who reviews interactions between various nodes and ledgers to discover discrepancies and malicious actors within the DAO system. In certain embodiments, bounty hunters may also review one or more of protocols, digital applications, and contracts to find bugs within the system. Bounty hunters may or may not be direct members of the DAO community.

In certain embodiments, a bounty hunter may be paid a reward in currency (for example, and without limitation, virtual tokens) for finding malicious entities (for example, and without limitation, entities partaking in front running, sandwiching, and/or vote manipulation), inconsistencies (for example, and without limitation, contract loopholes, ledger mismatches, invalid credentials, and/or invalid identities), and/or software flaws (for example, and without limitation, bugs). In certain embodiments, a bounty hunter's rewards may be determined ahead of time and may correspond to the severity of the issue identified.

Figure 3:
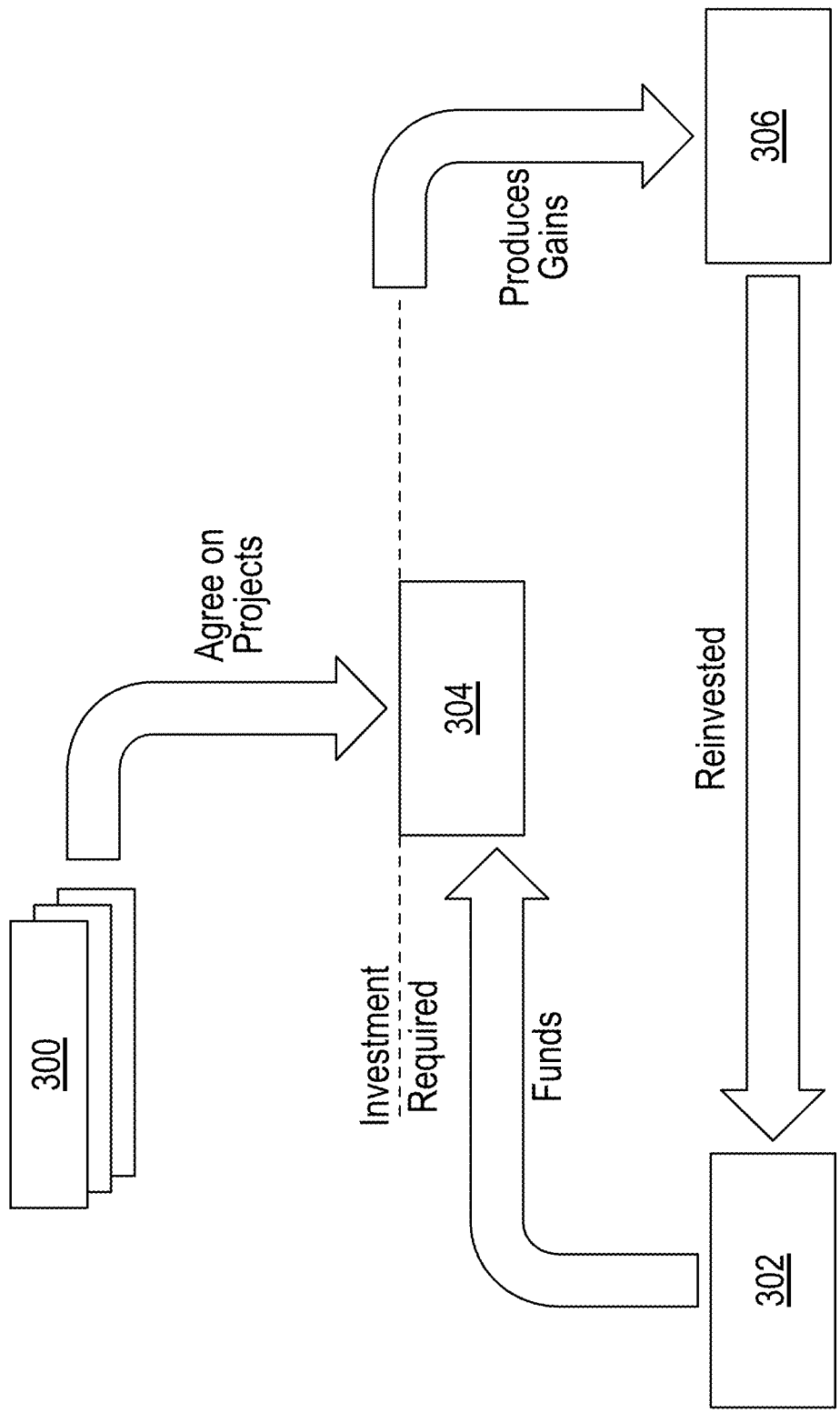
FIG. 3 is a flow chart illustrating a method for distributing funds throughout the phases of a steward-approved project plan within a DAO architecture, according to one or more embodiments.

FIG. 3 is a flow chart illustrating a method for distributing funds throughout the phases of a steward-approved project plan within a DAO architecture, according to one or more embodiments. A project 304 may be proposed by a project developer 202 (not shown). A voting group 300 (for example, and without limitation, a group of one or more stewards 204 and/or one or more representatives) may vote to approve a project 304. Upon approval, the project 304 may be funded via funds from the DAO treasury 302. The project may produce financial gains in the form of currency 306. Currency 306 may be reinvested into the DAO treasury 302. In certain embodiments, currency 306 reinvested into the DAO treasury 302 may be used to fund future projects 304 upon approval by a voting group 300. The DAO treasury 302 may contain one or more fiat currencies and/or a quantity of virtual tokens.

In certain embodiments, whether a given project will receive funds from the DAO treasury or DAO reserve may be determined via voting among stewards 204. In certain embodiments, the exchange rate between virtual tokens and VT may be 1:1. In certain embodiments, a steward 204 may be permitted to exchange its VT for virtual tokens at any point using the standard exchange rate (for example, and without limitation, 1:1). In certain embodiments, there may be a small fee applied to exchanges from VT to virtual tokens. Such a fee may exist to discourage vote-and-run behavior. Moreover, in certain embodiments, stewards 204 who convert their VT to virtual tokens may not be eligible to receive accumulated interest.

In certain embodiments, a voting goal may be created for each votable project. In certain embodiments, the voting goal for a given project may be a dynamically calculated value which indicates the number of votes that must be attained for the project to be accepted for funding. For example, and without limitation, the following equations may be used to calculate a voting goal:

$$BS_{Max} = NOS \cdot VP \cdot \left[\log_{LF}\left(\frac{VT}{(VP \cdot NOS)} + 1\right) - RC\right]^{PF} + 1;$$

$$BS_{Med} = NOS \cdot \left[\log_{LF}\left(\frac{VT}{NOS}\right) - RC\right]^{PF};$$

$$BS_{min} = NOS \cdot [\log_{LF}(VT - (NOS-1)) - RC]^{PF} + 1;$$

$$BV = \frac{(BS_{Min} - 1) \cdot 100}{BS_{Max}};$$

$$CM =$$

-continued

IF $PC >$ Treasury

THEN $CV_{Max}$

ELSE $\dfrac{PC}{\sqrt{(\text{Reserve}^2 + \text{Treasury}^2 \cdot PT)}} \cdot (CV_{Max} - CV_{Min}(+$ $CV_{Min}$;

$CV_{Max} = (SD + 0.5) \cdot 100$;

$DM =$ $\quad$ IF $\dfrac{PD + PC}{DR \cdot PT} < \dfrac{DS_{Min}}{100}$ $\quad$ Then $\dfrac{DS_{Min}}{100}$ $\quad$ ELSE $\text{Min}\left[\dfrac{PD + PC}{DR \cdot PT}, \dfrac{DS_{Max}}{100}\right]$;

$\quad DS_{Max} = 500$
$\quad DS_{Min} = 90$;
$\quad ERR = 0.12$;
$\quad ESS = 0.9$;

$GM =$ $\quad$ IF $\dfrac{PDGS}{\sqrt{\dfrac{PC}{2} \cdot PDGS}} > 1$ $\quad$ THEN 0

$\quad$ ELSE $GS_{Max} - \dfrac{PDGS}{\sqrt{\dfrac{PC}{2} \cdot PDGS}} \cdot GS_{Max}$;

$GS_{Max} = 10$;

$LF = 8$;

$\text{Mechanics} = \sum(CM, GM, RM, SM) \cdot DM + BV$;

$PF = 3$ $PT = 183$ $RC = -0.4$ $RM = \max\left(0, \min\left(\dfrac{PRR}{ERR} \cdot \dfrac{RS}{2}, RS\right)\right)$;

$RS = 7$;

$SM =$ $\quad$ IF $PES \geq ESS$ $\quad$ THEN 0

$\quad$ ELSE $\min(SS, (ESS - PES) \cdot)$;

$SS = 3$;

$SD = \text{std}(StewardVT) / \text{avg}(StewardVT)$ $\text{Votes} = [\log_{LF}(VT + 1) - RC]^{PF} + 1$; and $\text{VotingGoal} = \dfrac{\text{Mechanics}}{100} \cdot \max\left(BS_{Min}, \left(\dfrac{BS_{Min} + BS_{Med}}{SD}\right)\right)$,

WHEREIN:

| Variable | Definition |
|---|---|
| BSMax | Maximum Base Supply (representing the maximum vote supply) |
| BSMed | Median Base Supply (representing the median vote supply) |
| BSMin | Minimum Base Supply (representing the minimum vote supply) |
| BV | Base Vote |
| CM | Cost Mechanic |
| CVMax | Maximum Cost Votes (representing the maximum amount associated with a project's cost) |
| CVMin | Minimum Cost Votes (representing the minimum amount associated with a project's cost) |
| DM | Debt Mechanic |
| DR | Daily Revenue |
| DSMax | Maximum Debt Scalar (representing the maximum importance of debt) |
| DSMin | Minimum Debt Scalar (representing the minimum importance of debt) |
| ERR | Expected Return Rate |
| ESS | Expected Success Rate (representing the decimal-form percentage of a standard acceptable success project) |
| GM | Do Good Mechanic (representing a vote percentage associated with the amount of good a project provides) |
| GSMax | Maximum Do Good Scalar (representing the percentage that good affects the vote calculations) |
| LF | Log Factor |
| Mechanics | Represents various vote scaling weights to be applied to a project |
| NOS | Number of Stewards 204 in the DAO system |
| PC | Project Cost (representing the requested amount for the project in U.S. dollars) |
| PD | Pipeline Debt (representing the remaining amount to fund for approved projects in U.S. dollars) |
| PDGS | Project Do Good Score (representing an amount of U.S. dollars determined by an assessor to be equivalent to the amount of good the project will accomplish) |
| PES | Project Expected Success (representing the percentage chance in decimal form that a project will complete development and produce up to expectations) |
| PF | Power Factor |
| PRR | Project Return Rate (representing the anticipated return rate of a project in decimal form as verified by an assessor) |
| PT | Project Timeout (representing the number of days a project may be on the voting block, e.g., half a year). |
| RC | Reduction Constant (representing a constant to better transition low token rates) |
| Reserve | The amount of currency (for example, and without limitation, fiat currency) in the DAO reserve |
| RM | Revenue Mechanic (representing the affect the return of the project has on the votes needed to pass) |
| RS | Revenue Scalar (representing the vote acceptance weight associated with the revenue returns a project may produce) |
| SD | Supply Distribution (representing the distribution of voting power among stewards 204) |
| SM | Success Mechanic (representing the affect a project's likelihood of success has on the votes needed to be approved) |
| SS | Success Scalar (representing a vote acceptance weight associated with the likelihood of project completion) |
| StewardVT | The number of voting tokens held by each individual steward |
| Treasury | The amount of currency (for example, and without limitation, fiat currency) in the DAO treasury |
| Votes | The number of votes cast by stewards 204 for a given project |
| Voting Goal | The number of votes needed for a project to be approved |
| VP | Votable Projects (representing the number of projects that may currently be voted upon) |
| VT | Voting Tokens |

Note that the above equations are purely exemplary, and any appropriate voting mechanism may be used without departing from the scope of the present disclosure. In certain embodiments, a project with a completed funding contract in a "ready to vote" state (that is, a project that has gone through the necessary approvals) may be voted upon. Stewards 204 may vote by staking VT to one or more projects through a digital application. In certain embodiments, using VT to vote may not initially produce a one-to-one vote. In certain embodiments, an algorithmic voting mechanism may be used to reduce the control that large entities may otherwise have over the decision-making process.

In certain embodiments, stewards 204 may be free to allocate or de-allocate their VT at any time. In certain embodiments, VT may be given greater weight the longer it has been allocated to a given project. In certain embodiments, there may be a maximum weight to which a single VT may accrue. In certain embodiments, a VT's conviction and vested conviction may be determined according to the below equations:

$$\alpha = 0.64$$

$$CD = 5$$

$$VS = NOS \cdot \left[ \log_{LF}\left(\frac{VT}{NOS}\right) - RC \right]^{PF}$$

Today's Conviction =

IF (Days Committed ≥ CD)

$$\text{THEN}\left( \text{Votes} \cdot \alpha \cdot \frac{\left(\frac{VS - \sqrt{VS \cdot \text{Votes}}}{VS}\right)}{\text{Days Committed} + 1} \right)$$

ELSE 0

Today's Vested Conviction=
  IF (Days Committed>PT)
    THEN 0
  ELSEIF (Days Committed=0)
    THEN 0
  ELSE IF (Yesterday's Vested Conviction+Today's Conviction)>0
  ELSE Yesterday's Vested Conviction+Today's Conviction
  Else 0
WHEREIN the definitions of the above table apply, and:

| Variable | Definition |
|---|---|
| α | Scalar for conviction |
| CD | The number of days before a conviction yield is added to a vote |
| VS | Median base vote supply |
| Days Committed | The number of days a given VT has been committed to a given project. |
| Today's Conviction | Conviction yield associated with the current day. |
| Today's Vested Conviction | Accumulated conviction through the current day. |

Note that the above equations are purely exemplary, and any appropriate voting mechanism may be used without departing from the scope of the present disclosure. In certain embodiments, removing VT from an allocation may not remove the conviction votes for the allocation. In certain embodiments, removing VT from an allocation may begin a decay cycle, wherein the value of the previous conviction yield allocation decays at an increasing rate as compared to the dedication rate. In certain embodiments, the algorithms that manage DAO voting may not allow a situation in which transferring in and out of the same allocation increases the power of the vote across outcomes.

In certain embodiments, a project may be reassigned to an "actively funded status" and may be added to a list of distributable projects once it has met its voting goal. In certain embodiments, a DAO may have a crediting cycle by which it allocates funds to distributable projects. In certain embodiments, once a project has met its voting goal, VT may be de-allocated from the project and returned to the corresponding steward(s) 204. In certain embodiments, projects may undergo a time decay function once they have been added to a voting list to ensure that after a given date, the projects are no longer considered viable. In certain embodiments, if a project developer 202 wishes to proceed after its project has timed out, the project may be given an expedited path back to voting.

Figure 4A:
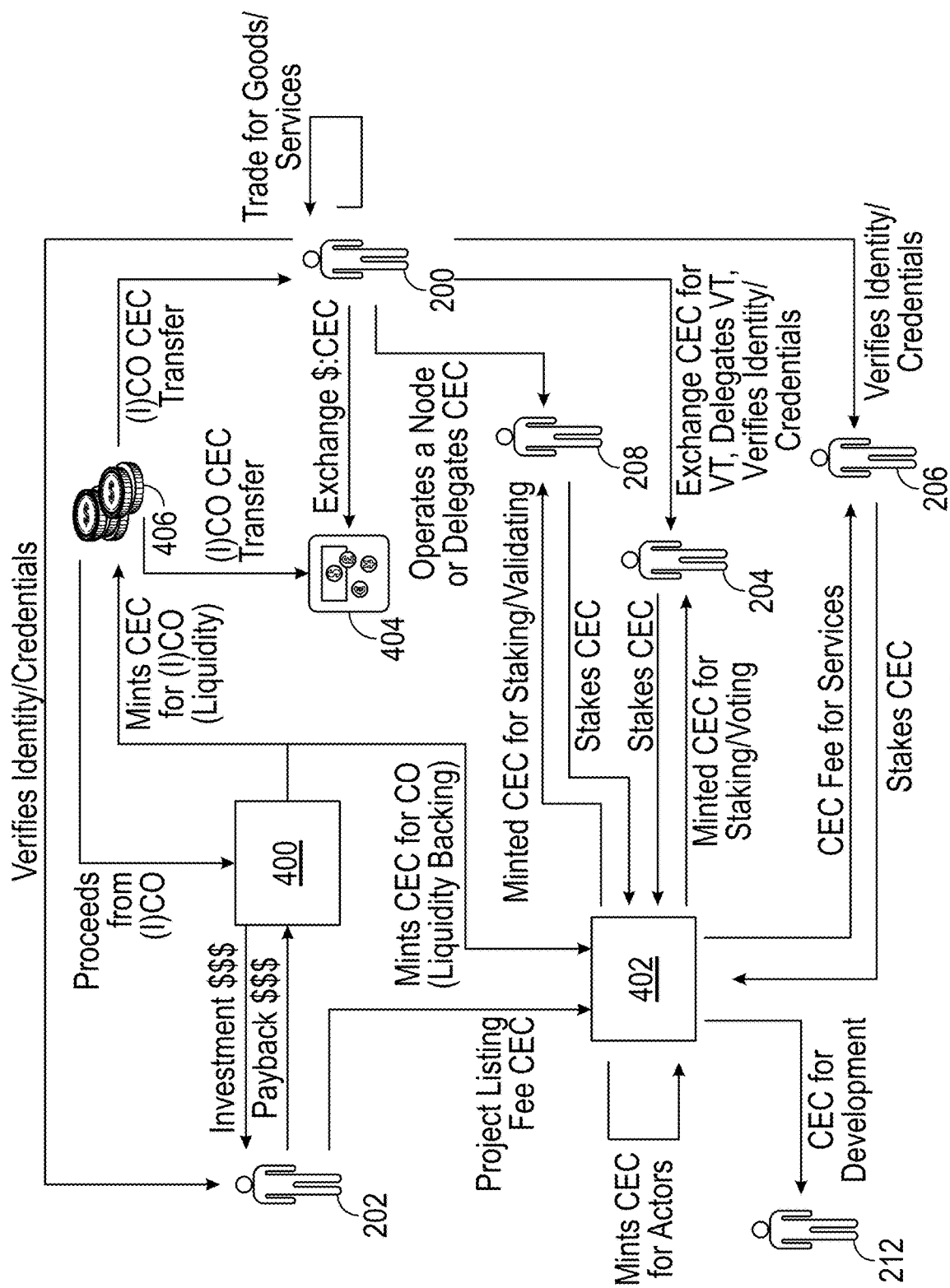
FIGS. 4A-4B are flow charts illustrating a method for managing funds and personnel within a DAO, according to one or more embodiments.
Figure 4B:
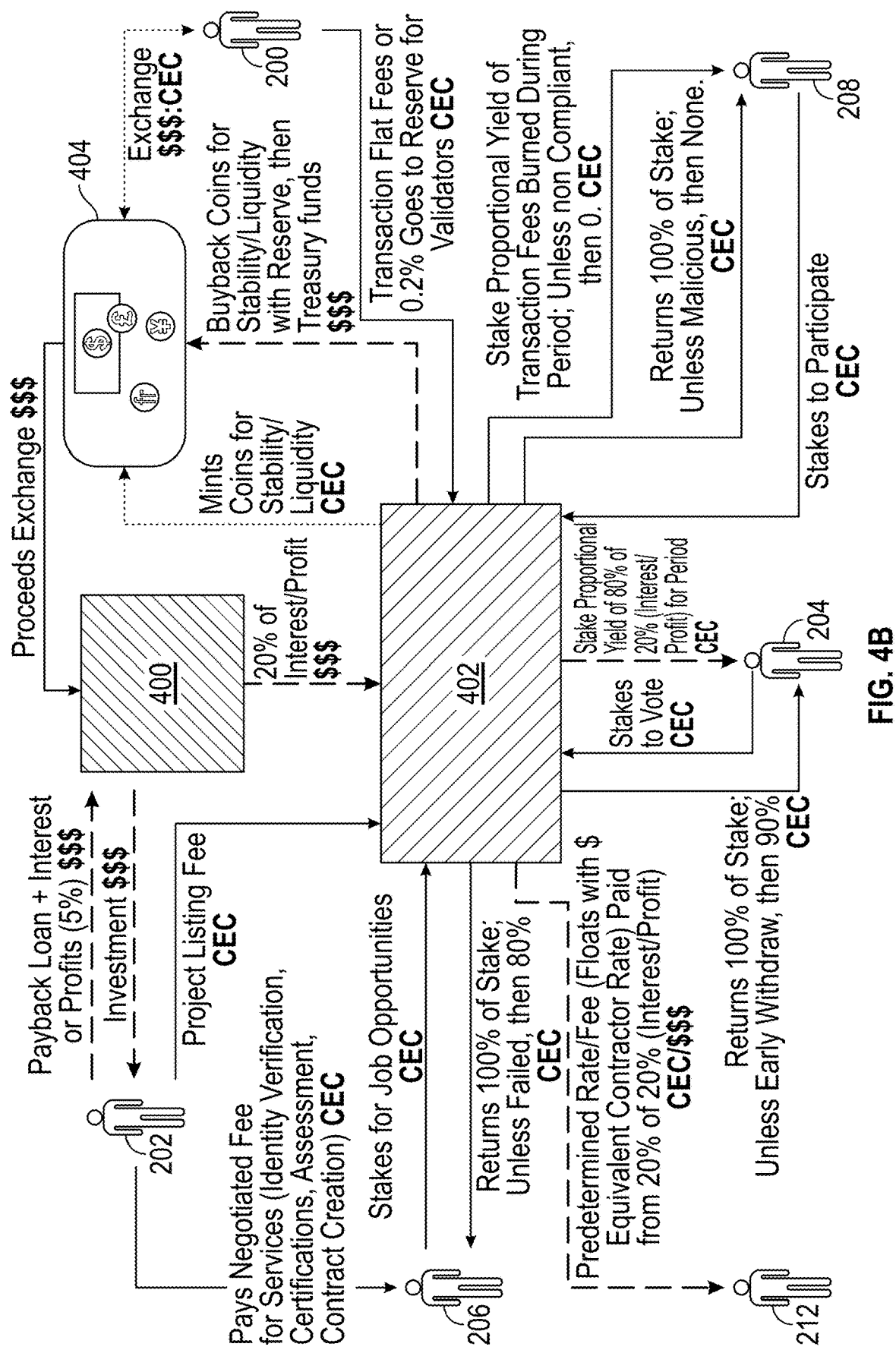

FIGS. 4A-4B are flow charts illustrating a method for managing funds and personnel within a DAO, according to one or more embodiments. A DAO is a type of decentralized system. A trader 200 may trade virtual tokens for one or more of goods, services, other virtual tokens, and fiat currency. In certain embodiments, a trader 200 may become a steward 204. In certain embodiments, the process by which a trader 200 may become a steward 204 may comprise three steps. First, a trader 200 may exchange a quantity of virtual tokens (for example, and without limitation, CEC) for a quantity of VT. Second, a trader 200 may assign or delegate VT to a proposed project. These steps do not have to occur in order; any order of these steps falls within the scope of the present disclosure. Moreover, steps may be subtracted or added without departing from the scope of the present disclosure. A trader 200 may become a steward 204 by exchanging or swapping virtual tokens with voting tokens (VT).

In certain embodiments, a project developer 202 may pay a negotiated fee for services to an auditor 206. In certain embodiments, a project developer 202 may receive investment funds from the DAO treasury 400 in the form of a loan. The loan may be repaid with interest and may be repaid from the profits of a project. In certain embodiments, a project developer may pay a project listing fee to the DAO reserve 402 to have the project voted upon by one or more stewards and/or representatives 204.

In certain embodiments, an auditor may stake virtual tokens to the DAO reserve 402 in exchange for job opportunities. The DAO reserve 402 may reimburse the entire stake unless the job is failed, in which a lesser percentage of the stake may be reimbursed (for example, and without limitation, 80%). In certain embodiments, a protocol developer 212 may be paid a predetermined rate or fee from the DAO reserve 402 in exchange for executing one or more software protocol changes.

In certain embodiments, one or more stewards 204 may stake virtual tokens to the DAO reserve 402 vote on one or more projects. In certain embodiments, the DAO reserve 402 may repay the entire stake; however, in certain embodiments, the DAO reserve 402 may withhold a percentage of the stake if the steward 204 withdraws its stake before a predetermined time period has elapsed.

Anyone may be a liquidity provider 404. In certain embodiments, a liquidity provider 404 may exchange proceeds with one or more of the DAO treasury 400, a trader 200, and another entity. In certain embodiments, a liquidity provider 404 may purchase fiat currency. In certain embodiments, a liquidity provider may contribute fiat currency and/or virtual currency to a liquidity pool. In certain embodiments, the DAO treasury 400 may transfer a percentage of interest earned and/or profit earned (for example, and without limitation, 20%) to the DAO reserve 402. In certain embodiments, the DAO reserve 402 may transfer a periodic stake-proportional yield to one or more stewards 204. In certain embodiments, the DAO reserve 402 may mint virtual currency. The virtual currency may be sent to a liquidity provider 404 to exchange with traders 200. In certain embodiments, one or more of the DAO treasury 400 and the DAO reserve 402 may act as a liquidity provider 404. In certain embodiments, the DAO reserve 402 may also buy back virtual tokens from a liquidity pool. Thus, the DAO reserve 402 may remove virtual tokens and fiat currency from the liquidity pool.

In certain embodiments, a transaction fee (for example, and without limitation, of all transactions) may be paid by traders 200 to the DAO reserve 402 in order to pay validators 208. In certain embodiments, a validator 208 may stake virtual tokens to the DAO reserve 402 in exchange for the right to participate in one or more DAO operations. The DAO reserve 402 may return the validator's stake 208 in its entirety; however, in certain embodiments, the DAO reserve 402 may withhold part or all of the validator's stake if the validator 208 acts maliciously. In certain embodiments, the DAO reserve 402 may compensate non-malicious validators 208 with funds proportional to the yield of transaction fees earned during a period.

In certain embodiments, a trader 200 may become a project developer 202 by having its identity and/or credentials verified by an auditor 206. Additional steps may be taken without departing from the scope of the present disclosure. In certain embodiments, a trader 200 may be required to pay a fee to become a project developer 202. A trader 200 may also become a validator 208. In certain embodiments, a trader 200 may be required to have its identity and/or credentials verified by an auditor 206 before becoming a validator 208. In certain embodiments, a trader may be required to pay a fee to become a validator 208. In certain embodiments, a validator may operate a node and/or distribute proceeds to other delegators. A validator 208, auditor 206, or any other role may become a trader by acquiring digital tokens.

In certain embodiments, a trader 200 may use a liquidity provider 404 to exchange currency for virtual tokens (for example, and without limitation, CEC). A coin offering ("CO") 406 (for example, and without limitation, an initial coin offering ("ICO")) may be used to transfer additional virtual tokens to the DAO treasury 400.

In certain embodiments, a DAO 400 may invest currency in one or more projects. Currency may be held in the DAO treasury 400. When approved projects produce revenue, a project developer 202 may return currency to the DAO treasury 400 (for example, and without limitation, one or more of fiat currency and virtual tokens).

In certain embodiments, the DAO treasury 400 may mint (that is, create) a quantity of virtual tokens for a CO 406. In certain embodiments, the DAO treasury may mint (that is, create) a quantity of virtual tokens and transfer the quantity of virtual tokens to a DAO Reserve 402. In certain embodiments, the DAO reserve 402 may mint its own virtual tokens and/or receive currency in the form of a fee from one or more project developers 202 in exchange for allowing a project to be listed on a registrar for approval. In certain embodiments, one or more auditors may stake virtual tokens (that is, transfer virtual tokens to one or more of the DAO treasury 400 or the DAO reserve 402) in exchange for the right to perform services. Once some or all of the auditor's services are performed, the auditor 206 may receive virtual tokens from one or more of the DAO treasury 400 or the DAO reserve 402. Similarly, in certain embodiments, one or more validators 208 and/or one or more delegators may stake virtual tokens in exchange for the right to perform services. Once some or all of the validator's services are performed, the validator 208 may receive virtual tokens from one or more of the DAO treasury 400 or the DAO reserve 402. Similarly, in certain embodiments, one or more individuals or entities may stake virtual tokens in exchange for the right to vote. The one or more stewards 204 or representatives may receive virtual tokens if the project is approved and the project incurs revenue. Alternatively, the one or more stewards 204 or representatives may be reimbursed their staked virtual tokens if the project is rejected. In certain embodiments, the one or more stewards 204 or representatives may be reimbursed a quantity of virtual tokens greater than their original staked virtual tokens due to interest accrued while the virtual tokens were staked.

The DAO treasury 400 may receive currency in exchange for virtual tokens. For example, and without limitation, the DAO treasury may receive one or more of fiat currency (for example, and without limitation, U.S. dollars), stable coins (for example, and without limitation, USDT), or other cryptocurrencies (for example, and without limitation, Ethereum and/or Bitcoin) from the sale of newly issued virtual tokens. In certain embodiments, the DAO treasury 400 may retain a first portion of the received currency; a second portion of the received currency may be transferred to the DAO reserve 402 to provide stabilization and/or to assist in future transactions.

In certain embodiments, individual investors and/or traders 200 may be able to purchase a DAO's virtual tokens from the DAO itself or from crypto exchanges, centralized exchanges, and/or decentralized exchanges. In certain embodiments, the DAO treasury 400 and/or reserve 402 may operate as a trader 200. Entities may hold virtual tokens in a virtual wallet (for example, and without limitation, Metamask). In certain embodiments, liquidity providers may procure a DAO's virtual tokens and other cryptocurrencies in order to execute market-making functions on one or more cryptocurrency exchanges to facilitate currency swaps by investors and/or traders.

In certain embodiments, the DAO treasury 400 may deliver funds to a project developer's virtual wallet as approved by the DAO after a successful voting process by stewards 204. In return, the project developer 202 may be required to deliver some or all of the funds produced by the project to the DAO treasury 400 per a funding contract.

In certain embodiments, one or more virtual wallets may be associated with one or more private keys. A private key may mathematically obfuscate access to one or more wallets in order to increase the cryptographic security of one or more of sending, receiving, and spending virtual tokens.

In certain embodiments, a DAO may maintain a reserve 402 of virtual tokens produced from ICOs, COs, or other fund-incurring processes. Periodically, the DAO may approve the minting of new virtual tokens to replenish the DAO reserve 402 in order to provide a reward for staking by project validators 208, delegators, stewards 204, and/or representatives. In certain embodiments, the DAO reserve 402 may be used to pay protocol developers 212 to implement changes to the DAO that have been approved by governors 210. In certain embodiments, the DAO reserve 402 may be used to pay auditors 206 for their services.

In certain embodiments, the process of selecting an auditor 206 to perform work may occur as a function based on one or more of the amount of virtual token(s) staked, the amount of time staked, the reputation of the auditor, matching credentials of the auditor and task requested, and randomness. In certain embodiments, auditors 206 who have recently performed tasks may have a lower chance or receiving additional tasks—in this way, a semi-equitable distribution of work among auditors 206 may be maintained. In certain embodiments, the highest selection factor in determining an auditor 206 to receive work may be the amount of virtual tokens staked. In certain embodiments, auditors 206 who have spent more time staked without being selected may have a higher chance of being assigned work. In certain embodiments, the following algorithm may be used to select an auditor 206 to perform a task:

$$AW = (AM \cdot CM \cdot RM \cdot SM)$$

$$CM = 1 + \frac{\text{\# of Matching Credentials}}{9}$$

$$RM = \max(0.1, \ln(2AR))$$

$$SM = \frac{AS}{TS}$$

WHEREIN:

| Variable | Definition |
| --- | --- |
| AM | Age Mechanic (representing the number of days an auditor 206 has been staked without being selected to receive work) |
| AR | Auditor's Reputation (representing an auditor's reputation score as a value between 0 and 2 with a default of 1) |
| AS | Auditor's Stake (representing the auditor's quantity of staked virtual tokens) |
| AW | Auditor's Weight (representing the weight/likelihood for a given auditor 206 to be selected) |
| CM | Credential Mechanic (representing the degree to which an auditor's credentials match with a given task) |
| RM | Reputation Mechanic |
| SM | Staking Mechanic |
| TS | Total Staked (representing the total amount of staked virtual tokens in the pool) |

In certain embodiments, auditors 206 may not be allowed to perform tasks requested by themselves. In certain embodiments, an auditor's staked currency may be lost if the task completed was deemed to be incorrect.

In certain embodiments, a non-fungible indicator associated with an account and/or wallet may be generated when the account holder's identity is verified. In certain embodiments, the non-fungible indicator may identify the entity identified, the source(s) of the verification, and/or a hash/checksum for matching the verification information with the identity information. In certain embodiments, the verification may no longer be valid if key identity information in the account or wallet is changed.

In certain embodiments, an auditor 206 may receive an increase in reputation score specific to identity verification upon successfully verifying an actor's identity. Conversely, in certain embodiments, an auditor may receive a decrease in reputation score upon incorrectly verifying an actor's identity or failing to verify an actor's identity.

In certain embodiments, reputation scores may be consolidated across an actor's tasks; in certain other embodiments, reputation scores may be unique to each of an actor's tasks. In certain embodiments, an auditor 206 may receive one or more reputational adjustments directly tied to the completion of one or more contracted tasks (including, and without limitation, one or more of verification, certification, project validation, contract negotiation, and assessment) acceptably or unacceptably (wherein a task is completed "acceptably" if it is confirmed by the other contracted party or other auditor for correctness and within the expected time). In certain embodiments, a reputational score may be specific to a category of work (that is, a task type) and may not transfer to other types. For example, and without limitation, an auditor 206 may have a high score for verification and a low score for assessment. In certain embodiments, the amount of reputational change may be dependent upon one or more of the type of contract and the reason(s) for marking a task as acceptable or unacceptable. In certain embodiments, a reputational change corresponding to a failure may be lessened by the replication of the same result from other auditors 206. Such a mechanism may reduce the effects of unhelpful or unwilling contract participants. In certain embodiments, post-contract reputation scores may be adjusted through downstream processes, such as a feedback loop for various project contracts from the users of the data (stewards and representatives) and from the contract initiators.

In certain embodiments, an auditor 206 may receive an increase in reputation score (including a general reputation score and/or a credential-verification-specific reputation score) upon successfully verifying an actor's credentials. Conversely, in certain embodiments, an auditor may receive a decrease in reputation score upon incorrectly verifying an actor's credentials or failing to verify an actor's credentials.

In certain embodiments, a project assessment process may be used to evaluate and verify a project plan for purposes of investment. A project assessment process may generate a series of weighted or unweighted scores associated with one or more points of interest. In certain embodiments, auditors 206 may determine the project assessment scores. In certain embodiments, stewards 204 or representatives may use one or more project assessment scores to assist in determining whether to vote for a project.

In certain embodiments, projects may be verified. In certain embodiments, project verification may only be permitted on behalf of verified entities. In certain embodiments, project verification may provide a non-fungible indicator ( ). The non-fungible indicator may indicate one or more of whether the plan has been verified, what the sources of the verification were, what project assessment scores are associated with the project (if any), and a hash/checksum for matching the verification information with the credential information. In certain embodiments, the verification may no longer be valid if key identity information in the plan is changed.

Any relevant aspect of a project may be assigned a project assessment score without departing from the scope of the present disclosure. For example, and without limitation, return rate may be included as a project assessment score. Return rate may be defined as the average projected rate of return per time period over the lifespan of the payback. Alternatively, a contractually determined number may be used as the return rate. In certain embodiments, the return rate may be provided by the project developer 202. In certain embodiments, the project developer 202 may further provide the period and/or frequency relevant to the return rate. In certain embodiments, an auditor 206 may be required to independently calculate and/or confirm one or more values provided by a project developer 202.

In certain embodiments, project expected success may be included as a project assessment score. Project expected success may be a percentage value representing the likelihood that the project will complete development and reach its expected return rate. In certain embodiments, project expected success may be calculated based on one or more of the project's utility score, the project developer's history and/or credentials, the project's development plan, the relevant geopolitical climate for the project, and other factors.

In certain embodiments, utility may be included as a project assessment score. Utility may be used as a score of risk aversion. Furthermore, utility may provide insight for the project expected success score.

In certain embodiments, project cost may be included as a project assessment score.

In certain embodiments, a do-good value may be included as a project assessment score. A do-good value may be a financial representation (at the time of calculation) of the social value of the project. In certain embodiments, a do-good value may be thought of in terms of the value of carbon mitigation and/or carbon sequestration (per market credit rates) of the project. In certain embodiments, a do-good value may include communal and/or social factors which may be added and valued in economic terms. For example, and without limitation, the production of clean water as a byproduct of energy generation may be valued based on the difference in time (that is, the economic gain) that the community saves. In certain embodiments, do-good values may be accompanied by additional documentation to explain the rationale of the value.

In certain embodiments, the process for generating a project assessment score may be carried out by multiple auditors 206. In certain embodiments, a fee may be paid to one or more auditors 206 in exchange for project assessment score services. A standard calculation may be used to determine a value of the fee based upon information provided about the project. In certain embodiments, an auditor's reputation score (including a general reputation score and/or an assessment-specific reputation score) may be impacted by the quality of its work in producing project assessment scores.

In certain embodiments, contract creation may commence after project assessment has completed. In certain embodiments, contract creation may culminate in the creation of a deterministic smart contract for the funding and proceeds distributions of a project. One or more project developers 202 and one or more auditors 206 may work together toward a mutually acceptable contract. In certain embodiments, an auditor 206 may have access to a series of templates provided by the DAO contracting system to ease the creation of the contract. In certain embodiments, a contract may be evaluated by an algorithm of the DAO to guarantee the contract's deterministic nature. In certain embodiments, an auditor 206 may function in a dual role; an auditor may (1) create a deterministic smart contract; and (2) provide knowledge as to what project and/or contract traits are likely to garner votes from stewards 204 and representatives. A contract may establish an expected funding amount, which may be payable to the project developer 202. The payment of funds may be structured in a lump sum or a tiered fashion based upon deterministic milestones. In certain embodiments, a return mechanism may be implemented, allowing for the return of funds back to the DAO treasury 400. In certain embodiments, a project may be assigned a "ready to vote" status upon completion of contract creation.

Upon completion of contract creation, an auditor 206 may be paid some or all of the contract fee. In certain embodiments, an auditor 206 may review the contract upon its completion. In certain embodiments, the relevant project developer 202 may review the contract after the auditor's (or auditors') reviews are completed. A project developer 202 may have the option to terminate the contract, accept the contract, or send the contract back to an auditor 206 for changes. If a project is terminated, the relevant project developer 202 may be refunded the remaining contract fee. If the contract is accepted, the project may be made available for voting and the relevant auditor(s) 206 may receive the remaining contract fee. In certain embodiments, a project developer 202 may provide a score based on the auditor(s) 206 performance, which may impact the auditor(s) 206 reputation score(s). In certain embodiments, a project developer 202 may provide a segmented score, which may be subdivided into multiple parts. For example, and without limitation, a project developer 202 may provide separate scores as to an auditor's performance for credentials verification, identity verification, contract negotiation, contract drafting, etc.

In certain embodiments, a contract may include time-based restrictions such that the contract cannot remain in an indeterminate state in excess of a predetermined period of time. A project developer 202 may not be permitted to block the final tiered milestone of funding in order to avoid initiation of the return process.

Figure 5:
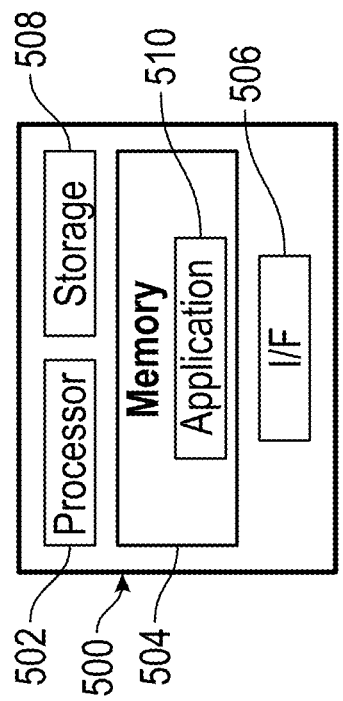
FIG. 5 is a block diagram illustrating components of an example control server, according to one or more embodiments.

FIG. 5 is a block diagram illustrating components of an example control server, according to one or more embodiments. Control server 500 may refer to any computing system for performing the algorithms and communications described herein, and may include processor 502, storage 508, interface 506, and memory 504. In some embodiments, control server 500 may refer to any suitable combination of hardware and/or software implemented in one or more modules to process data and provide the described functions and operations. In some embodiments, the functions and operations described herein may be performed by a pool of control servers 500. The algorithms described herein may be performed by one or more control servers, such as the control server illustrated in FIG. 5.

Memory 504 may refer to any suitable device capable of storing and facilitating retrieval of data and/or instructions. Examples of memory 504 include computer memory (for example, Random Access Memory ("RAM") or Read Only Memory ("ROM")), mass storage media (for example, a hard disk), removable storage media (for example, a Compact Disk ("CD") or a Digital Video Disk ("DVD")), database and/or network storage (for example, a server), and/or or any other volatile or non-volatile, non-transitory computer-readable memory devices that store one or more files, lists, tables, or other arrangements of information. Although FIG. 5 illustrates memory 504 as internal to control server 500, memory 504 may be internal or external to control server 500, depending on particular implementations. Also, memory 504 may be separate from or integral to other memory devices to achieve any suitable arrangement of memory devices for use in the DAO.

Memory 504 is generally operable to store one or more applications 510. Application(s) 510 generally refer to logic, rules, algorithms, code, tables, and/or other suitable instructions for performing a particular application described herein.

Processor 502 is communicably coupled to memory 504. Processor 502 is generally operable to execute application 510 stored in non-transitory form in memory 504. Processor 502 may comprise any suitable combination of hardware and software to execute instructions and manipulate data to perform the described functions for control server 500. In some embodiments, processor 502 may include, for example, one or more computers, one or more central processing units ("CPUs"), one or more microprocessors, one or more applications, and/or other logic.

Storage 508 is communicably coupled to processor 502. In some embodiments, storage 508 may refer to any suitable device capable of storing and/or facilitating retrieval of data and/or instructions. Examples of storage 508 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Storage 508 may store data, such as contract data, device performance data, etc.

In some embodiments, interface 506 is communicably coupled to processor 502 and may refer to any suitable device operable to receive input for control server 500, send output from control server 500, perform suitable processing of the input or output or both, communicate to other devices, or any combination of the preceding. Interface 506 may include appropriate hardware (for example, and without limitation, a modem, network interface card, etc.) and software, including protocol conversion and data processing capabilities, to communicate through a network or other communication system that allows control server 500 to communicate to other components of the DAO. Interface 506 may include any suitable software operable to access data from various devices such as components of nodes or other components such as energy trading/pricing/forecasting platforms.

Figure 6:
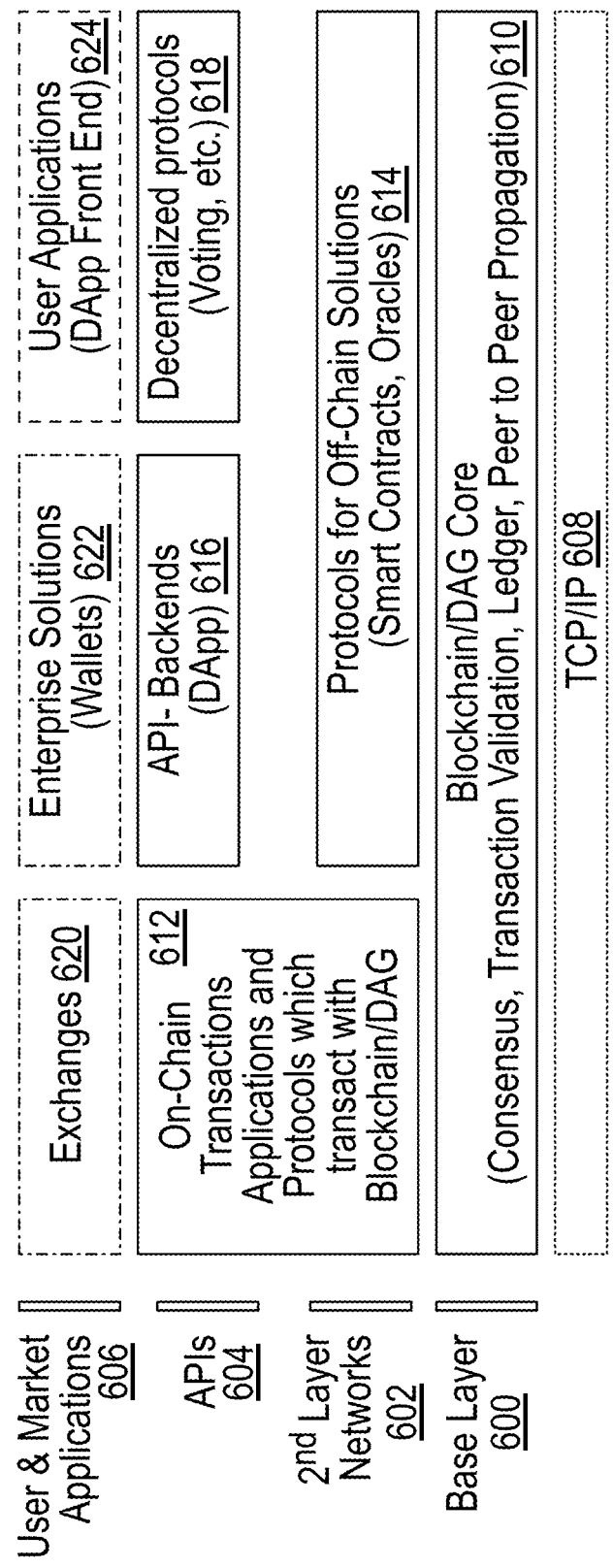
FIG. 6 is a stack diagram illustrating a software system for a DAO, according to one or more embodiments.

FIG. 6 is a stack diagram illustrating a software system for a DAO, according to one or more embodiments. In certain embodiments, the DAO may run on a TCP/IP protocol. The base layer 600 may comprise a blockchain or a DAG core 608. The blockchain or DAG core 608 may be responsible for one or more of node consensus determination, transaction validation, ledger maintenance and/or creation, and peer-to-peer propagation. The second layer 602 may be responsible for one or more protocols for off-chain solutions 614, including, and without limitation, smart contracts and/or oracles. The application programming interface 604 ("API") may be responsible for one or more API backends 616 (for example, one or more digital applications) and/or one or more decentralized protocols 618 (for example, and without limitation, one or more voting protocols). On-chain transactions applications and protocols 612 may be handled by second layer networks 602 and/or APIs 604, and may transact with the blockchain and/or DAG core 610. User and/or market applications 606 may be responsible for one or more exchanges 620, one or more enterprise solutions 622 (for example, and without limitation, one or more virtual wallets), and/or one or more user applications 624 (for example, and without limitation, the front end of a digital application). The individual layers of FIG. 6's stack diagram are discussed in more detail below.

Layer 1: Base Layer

Running on top of TCP/IP, the base layer may be comprised of the platform core software. In certain embodiments, the base layer may be developed as an open-source software that may include one or more of a blockchain and/or DAG core, a proof-of-stake-based transaction validation, and one or more peer-to-peer propagation functions that run the DAO network. In certain embodiments, modification to the DAO's core software may be driven through one or more improvement proposals. In certain embodiments, improvement proposals may be voted on and approved by the governance process.

Layer 2: On-Chain and Off-Chain Transactions

Token transactions are activities that take place on the main blockchain or DAG. For example, and without limitation, transactions of virtual tokens between the DAO treasury and an entity's wallet may be token transactions. Solution transactions are activities that take place outside the main blockchain or DAG. For example, and without limitation, smart contracts used to implement agreements between the project developers 202 and the DAO may be solution transactions.

Layer 3: APIs

In certain embodiments, the API layer may be comprised of one or more of server/client interface to backend contract generators, digital applications, and oracles. For example, and without limitation, an API may connect a project profiling engine to a smart contract generator.

Layer 4: User and Market Applications

In certain embodiments, the user-and-market-applications layer may comprise one or more high-level user applications. In certain embodiments, the one or more high-level user applications may support the market cases and/or use cases of the DAO. For example, and without limitation, wallets, payment processors, escrow, reserves, exchanges, and/or other applications may operate on the user-and-market-applications layer.

In certain embodiments, a DAO may be initialized by a founding organization that creates a first plurality of virtual tokens within a virtual treasury. In certain embodiments, the founding organization may then initiate an ICO, thereby allowing public investment in the DAO.

In certain embodiments, a decentralized application may be utilized to allow one or more traders 200 to interface with the virtual reserve 402. The traders 200 may acquire virtual tokens by exchanging another currency (for example, and without limitation, a fiat currency or another virtual currency) in exchange for the reserve's virtual tokens. The reserve's virtual tokens need not be acquired in whole integers; rather, an trader may acquire a fraction of a virtual token. In certain embodiments, it may be necessary for a trader 200 to register a virtual wallet before acquiring the virtual currency.

In certain embodiments, a trader 200 may send the virtual tokens to one or more other traders 200 in one or more transactions. In certain embodiments, a trader 200 may exchange one or more voting shares in exchange for virtual tokens. A liquidity provider may allow a trader to exchange virtual tokens for another currency (for example, and without limitation, a fiat currency or another virtual currency).

In certain embodiments, projects may be funded from the virtual treasury 400 via a voting process. A vote may be cast by exchanging virtual tokens for VT with the DAO's reserve in a process called "staking." Any trader 200 who stakes their virtual tokens to acquire VT is considered a steward 204. The act of staking increases the seriousness and gravity of the voting process, as stewards' virtual tokens will be illiquid throughout the staking process. In certain embodiments, the exchange rate between virtual tokens and VT may be based off a logarithmic algorithm to discourage a plutocracy. In certain embodiments, exchanges between virtual tokens and VT may be accompanied by a tax in order to discourage Sybil attacks. Once staked, a steward 204 may commit their VT to any project that is "ready for vote" via a funding contract. In certain embodiments, a registry of one or more projects may be accessible to one or more stewards 204. In one or more embodiments, the value of the VT may appreciate over time once it is assigned to a project. As VT is assigned to a project, its voting weight and illiquid monetary value may increase over time. This mechanism of increasing the weight and value of project-assigned VT may be referred to as "conviction voting," and it may further discourage Sybil attacks. In certain embodiments, stewards 204 may be free to unassign their VT at any time; however, removing VT may retain only its principal value (that is, the value originally assigned by a steward 204), and the accumulated weight and value from conviction voting may be lost. In other embodiments, the accumulated weight and value from conviction voting may not be immediately lost upon withdrawal of VT from assignment; rather, it may depreciate over time. In certain embodiments, withdrawn VT may depreciate at a rate faster than the rate of conviction voting appreciation.

In certain embodiments, a steward 204 may go through an identification verification process to become a representative. A steward 204 seeking to become a representative may be able to skip the identification verification process if prior verification has already been performed (for example, and without limitation, if the steward 204 was previously verified to become an auditor 206). In certain embodiments, the governors 210 may approve a steward 204 to become a representative. The decentralized application may add confirmed representatives to a registrar. In certain embodiments, a steward 204 may be required to pay virtual tokens to become a representative. Representatives are stewards 204 that may be delegated VT from other stewards 204 to vote on the staking stewards' behalf; in this way, the voting process of the DAO may resemble a republic (that is, a system in which members elect representatives to vote on their behalf), a direct democracy (that is, a system in which members vote directly on behalf of themselves), or any combination thereof. In certain embodiments, the mechanism by which representatives vote on stewards' behalf may be referred to as "liquid democracy." In certain embodiments, a representative may be assigned a reputation score based on the historic performance of projects for which the representative has voted in the past. In certain embodiments, a representative may be removed from representative status based on one or more criteria (for example, and without limitation, a poor reputation score or other undesirable behavior); in other embodiments, representative status may be permanent.

In certain embodiments, a project may be approved upon acquiring an amount of VT equal to or exceeding a predetermined funding goal. In certain embodiments, approved projects may be removed from a votable list of projects held in a registrar. One or more stewards 204 and/or representatives who voted to approve a project that was ultimately approved may be recorded for the purpose of modifying their reputation score. In certain embodiments, a steward 204 who assigned VT to approve a project may receive the principal amount of VT assigned upon approval of the project. In certain other embodiments, a steward 204 who assigned VT to approve a project may receive the full, accumulated value of VT (including value gained from conviction voting) upon approval of the project. In certain embodiments, stewards 204 who approved a project may receive virtual tokens as an interest payment proportional to the VT staked or as a proportional yield associated with proceeds from project returns. In certain embodiments, a steward 204 may be permitted to exchange its VT for an equivalent value of virtual tokens at any point. In certain embodiments, when a steward 204 votes through a representative for a project that is later approved, a portion of the rewards associated with the voting may go to the representative and a portion of the rewards associated with the voting may go to the steward 204. In certain embodiments, the steward's share of rewards may be larger than the representative's share.

In certain embodiments, new projects may be proposed by project developers 202. In certain embodiments, project developers may pay virtual tokens to request a funding contract. Auditors 206 may determine whether the funding contract should be granted. In certain embodiments, project developers 202 may pay additional virtual tokens to have their requests for funding contracts reviewed by auditors 206 in an expedited fashion. In certain embodiments, two or more auditors 206 may be required to approve a funding contract. In certain embodiments, auditors 206 may determine whether to approve a project by using one or more criteria (for example, and without limitation, an auditor 206 may verify the project and project developer's credentials, perform a project feasibility check, and/or review documentation for problems). In certain embodiments, auditors 206 and project developers 202 may work together to adjust project funding contracts. Once the assigned auditors 206 and the project developer 202 agree that a funding contract is acceptable, the project may be listed on a registrar as a "fundable project." In certain embodiments, auditors 206 may be compensated via a fee arrangement that pays out at successive milestones. For example, and without limitation, an auditor 206 may be paid 15% of its fee after verifying the relevant project developer's identity, 40% after completing a feasibility study, 15% after creating a contract, and 30% after the contract is accepted.

In certain embodiments, a relevant project developer 202 may pay virtual tokens to repeat the audit process in the event that an auditor 206 has rejected a proposed funding contract. In certain embodiments, projects associated with sub-projects or parent projects that have already undergone a successful audit may be allowed to skip one or more phases of the audit process.

In certain embodiments, an oracle (that is, an off-chain resource used for verification and validation of contracts) may be used to communicate data to one or more smart contracts. An oracle may collect data itself or receive data from one or more third-party sources. In certain embodiments, data from a project may be communicated by an oracle to a smart contract. In certain embodiments, the data may be a metric by which the success of the project is determined for the purpose of generating a representative's reputation score. The data may be any useful data, including, and without limitation, an amount of energy produced, a level of vegetation density, video surveillance footage or other evidence of carbon sequestration, documentation of land ownership, documentation of resource production, other useful data, or any combination thereof.

In certain embodiments, if payment for a project is insufficient to cover costs, the DAO may transition the project to an "insufficient payment" state. The DAO may update the project status to indicate the insufficient payment. A project developer 202 of an approved project may provide additional payment to the appropriate smart contract with the insufficient payment to resolve the situation.

In certain embodiments, a trader 200 may begin the process of becoming an auditor 206 by completing an associated form and/or paying a fee with virtual tokens. In certain embodiments, an existing auditor 206 may initiate an identification process to determine the identity of the trader 200 seeking to become an auditor 206. In certain embodiments, the existing auditor 206 may provide identification information to one or more smart contracts. In certain embodiments, two or more auditors 206 may be needed to approve a trader's request to become an auditor 206. In certain embodiments, if the two auditors' identification results match, each auditor 206 may be paid a portion (for example, and without limitation, 25%) of the auditors' fee. In certain embodiments, if the two auditors' identification results do not match, then a third auditor 206 may be assigned to verify the identity. If the third auditor's identification results match one of the first two auditors' identification results, the auditors 206 with matching identification results may be paid the portion of the auditors' fee and the nonmatching auditor 206 may lose its right to a fee. If the third auditor's identification results do not match either of the first two auditors' identification results, subsequent auditors may be added until two auditors' identification results match. After identification, the trader 200 may confirm the identification.

Following identification of a trader 200 seeking to become an auditor 206, the trader may undergo a certification process. Once certification is complete, certification data may be provided to one or more smart contracts. In certain embodiments, two or more auditors 206 may be needed to approve a trader's request to become an auditor 206. In certain embodiments, if the two auditors' certification results match, each auditor 206 may be paid a portion (for example, and without limitation, 25%) of the auditors' fee. In certain embodiments, if the two auditors' certification results do not match, then a third auditor 206 may be assigned to certify the trader 200. Once the third auditor's certification results match one of the first two auditors' certification results, the auditors 206 with matching certification results may be paid the portion of the auditors' fee and the nonmatching auditor 206 may lose its right to a fee.

Auditors 206 are responsible to validate, verify, and assess projects and entities within the DAO. To ensure fairness, auditors 206 must stake virtual tokens in a proof-of-stake method to win the chance to work on contracts. In certain embodiments, an auditor 206 may be assigned to work on a smart contract based off a weighted system with one or more criteria. In certain embodiments, the criteria may comprise one or more of stake size, auditor score, certifications associated with the relevant request, and a randomly generated value. A randomly generated value may be included within the selection algorithm in order to facilitate an equitable distribution of work. An auditor may stake virtual tokens to indicate its level of interest in processing contracts and in order to increase its odds of being awarded one or more smart contracts to validate, verify, and/or assess. In certain embodiments, auditors 206 may be assigned a reputation score based on their performance in validating, verifying, and/or assessing projects and/or entities.

A DAO may comprise one or more servers. In certain embodiments, a DAO may comprise two servers. A first server may be operable to store a plurality of first virtual tokens, wherein each one of the plurality of first virtual tokens may be associated with fiscal value. Fiscal value may take the form of one or more fiat currencies (for example, and without limitation, U.S. dollars) and/or one or more other virtual tokens. Those skilled in the art will understand that the values of the first virtual tokens need not directly follow the value of a fiat currency; rather, the first virtual tokens may be associated with one or more fiat currencies insofar as one or more fiat currencies may be used to purchase a quantity of the first virtual tokens. A second server may be operable to store a plurality of second virtual tokens, wherein each one of the plurality of second virtual tokens may correspond to a unit of voting power (for example, and without limitation, VT).

In certain embodiments, a DAO may operate through a plurality of nodes. In certain embodiments, any role within a DAO may have one or more nodes associated with that role. For example, and without limitation, auditors 206 may be associated with one or more auditor nodes; project developers 202 may be associated with one or more project developer nodes; validators 208 may be associated with one or more validator nodes; stewards 204 may be associated with one or more steward nodes; protocol developers 212 may be associated with one or more protocol developer nodes 212; governors 210 may be associated with one or more governor nodes; and/or other roles may be associated with one or more other nodes.

Figure 7:
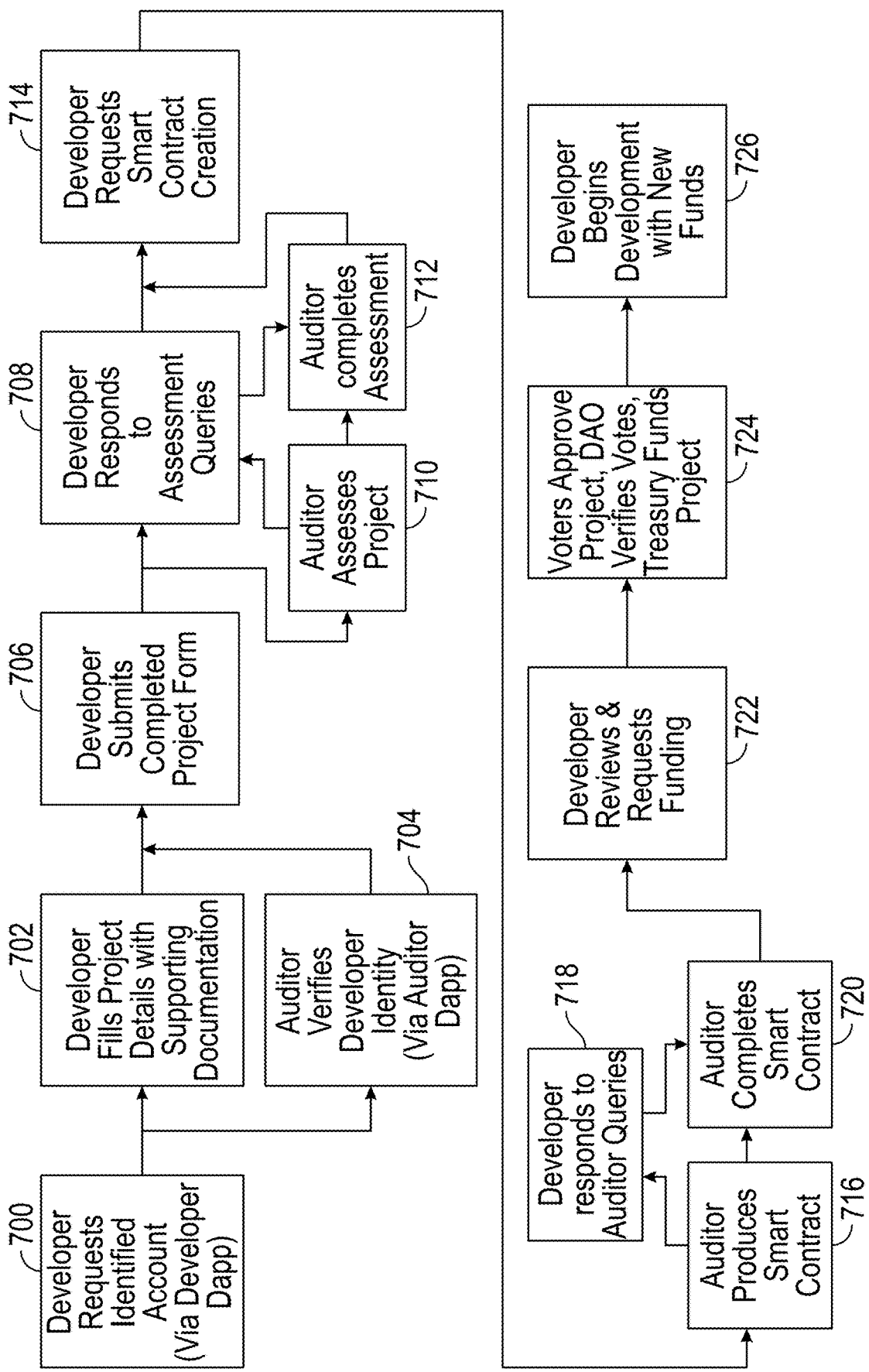
FIG. 7 is a process diagram illustrating a method for initiating a project within a DAO, according to one or more embodiments.
Figure 8B:
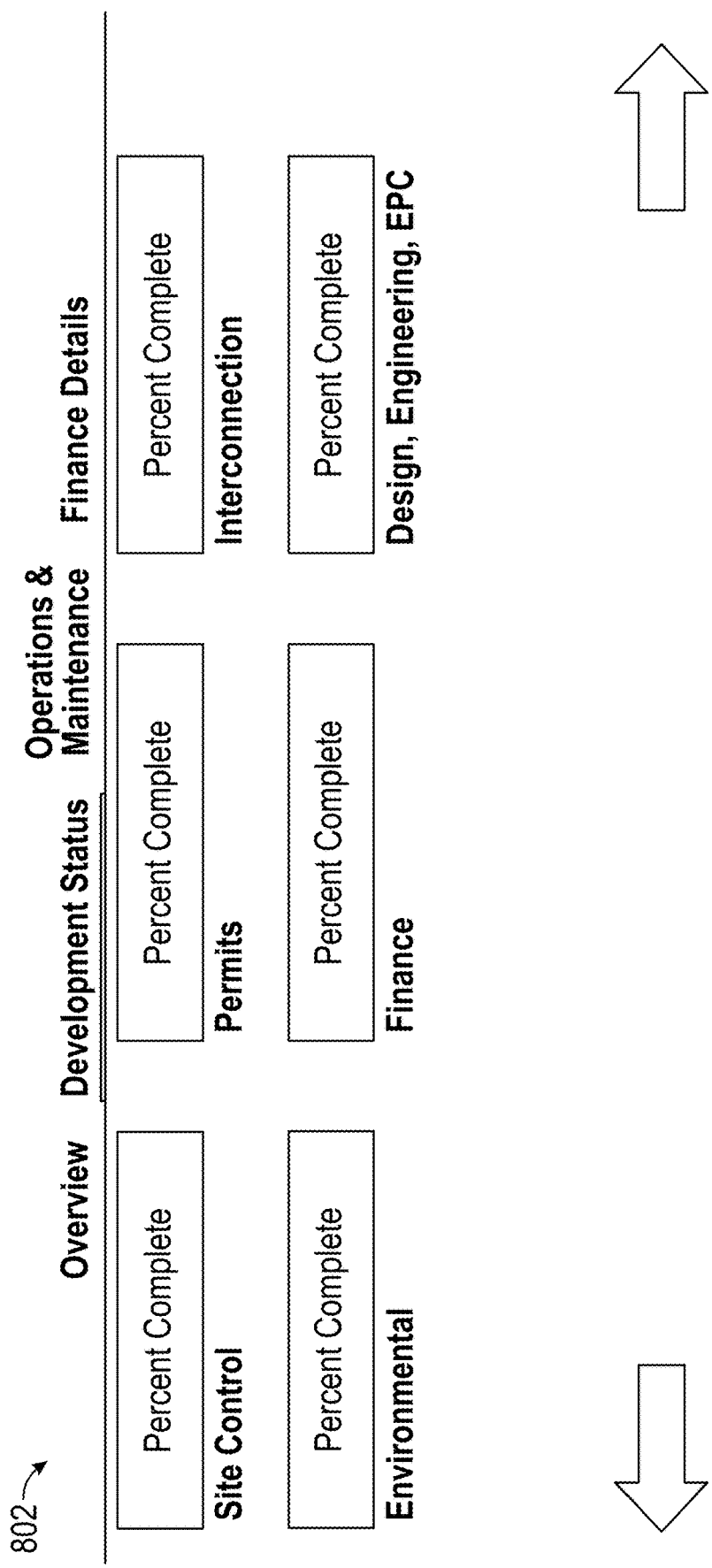
Figure 8C:
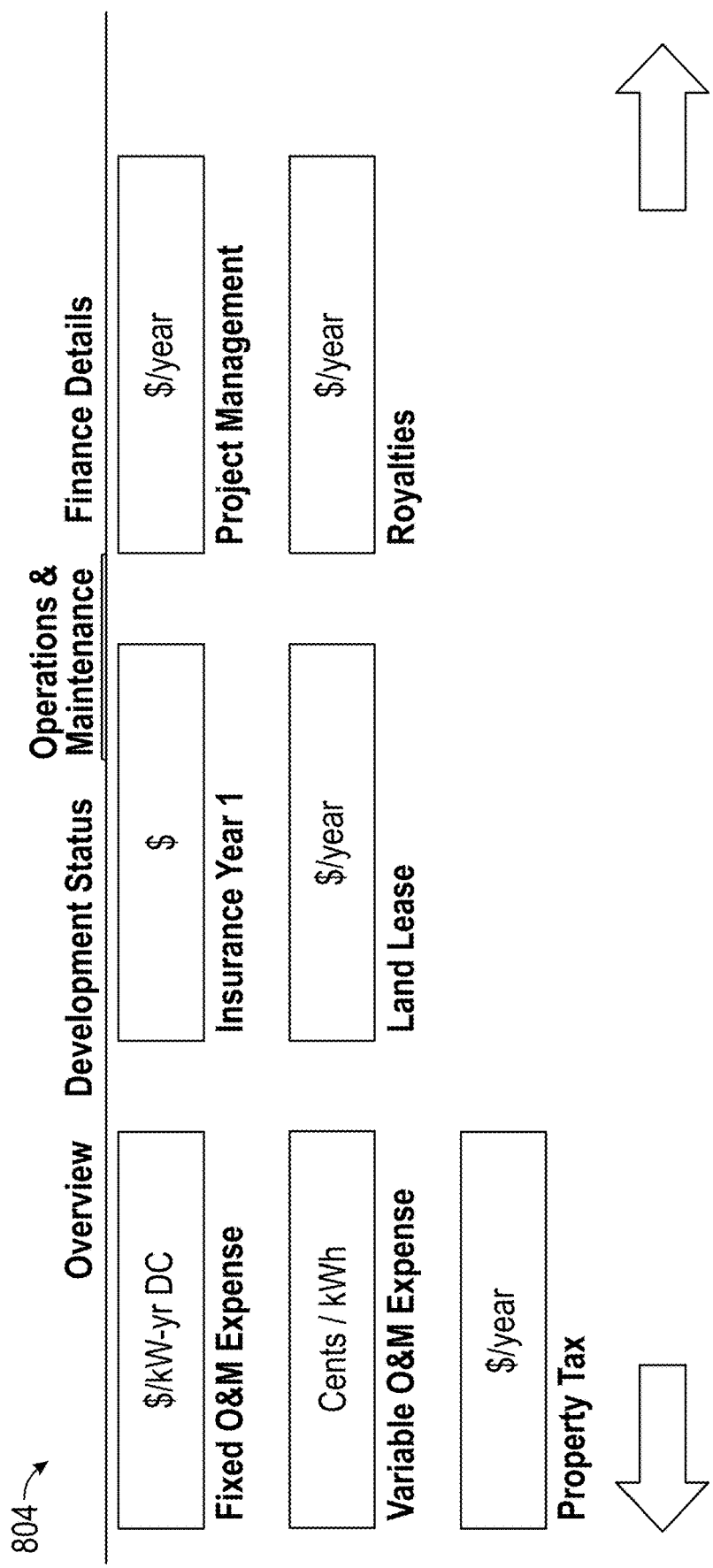
Figure 8D:
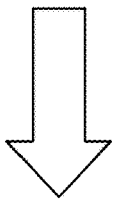

FIG. 7 is a process diagram illustrating a method for initiating a project within a DAO, according to one or more embodiments. In certain embodiments, a project developer 202 may request an account using a digital application 700. The project developer 202 may fill out project details with supporting documentation 702. An auditory 206 may verify the developer's identity using a second digital application 704. In certain embodiments, step 702 and step 704 may occur at or around the same time. The project developer 202 may then submit a completed project form 706. The project developer 202 may respond to assessment queries 708 from an auditor 206 while the auditor assesses the project 710. Once the auditor 206 has completed project assessment 712, the project developer 202 may request creation of one or more smart contracts 714. The project developer 718 may respond to assessment queries 718 from an auditor 206 while the auditor produces one or more smart contracts 716. Once the auditor 206 has completed the one or more smart contracts 720, the project developer 202 may review the one or more smart contracts and request funding 722. Voters (such as stewards and representatives 204) may vote to approve the project, the DAO may verify the votes, and the DAO treasury 400 may fund the project 724. Once funding is received, the project developer 202 may begin development using the new funds 726. The steps listed in this paragraph are purely exemplary and non-limiting. It is within the ability of one of ordinary skill in the art and with the benefit of the present disclosure to select one or more appropriate steps for initiating a project. Moreover, steps may be added, omitted, or performed in a different sequence without departing from the scope of the present disclosure.

FIGS. 8A-8D are example user interfaces for DAO project management, according to one or more embodiments. In certain embodiments, an overview page 800 may be used as a base page from which a user may view, enter, and/or search for information about a DAO project. In certain embodiments, a user may view, enter, and/or search for information regarding the status of a DAO project using a development status page 802. In certain embodiments, a user may view, enter, and/or search for information regarding expenses related to operations and maintenance of a DAO project using an operations and maintenance page 804. In certain embodiments, a user may view, enter, and/or search for information regarding project financing using a finance details page 806. User interfaces 800, 802, 804, and 806 are purely exemplary and non-limiting. Other user interfaces may be used without departing from the scope of the present disclosure, and it is within the ability of one skilled in the art and with the benefit of the present disclosure to select a suitable user interface.

While various embodiments of a DAO were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims, and all changes to the invention that fall within the meaning and the range of equivalency of the claims are to be embraced within their scope.

What is claimed is:

1. A decentralized system for mitigating climate change, comprising:
   one or more first servers operable to store a plurality of first tokens, wherein each one of the plurality of first tokens is associated with fiscal value;
   one or more second servers operable to store a plurality of second tokens, wherein each one of the plurality of second tokens corresponds to a unit of voting power;
   one or more project developer hardware nodes operable to transmit project data associated with a project corresponding to one or more of renewable energy and carbon sequestration;
   one or more auditor hardware nodes operable to:
      verify an identity associated with one or more project developer wallets based at least in part on identity information provided within the project data;
      validate credentials associated with the one or more project developer wallets based at least in part on credential information provided within the project data;
      perform a project assessment on the project associated with the project data based at least in part on one or more factors; and
      generate a smart contract based at least in part on the project data;
   one or more validator hardware nodes operable to:
      receive a first signal indicating the verified identity and/or the validated credentials associated with the one or more project developer wallets;
      receive a second signal comprising the project assessment and/or the generated smart contract; and
      transmit the verified identity associated with the one or more project developer wallets, the validated credentials associated with the one or more project developer wallets, the project assessment, the generated smart contract, or a combination thereof to a blockchain database; and
   one or more steward hardware nodes, wherein each one of the one or more steward hardware nodes is operable to:
      stake one or more second tokens from the plurality of second tokens for one or more units of voting power; and
      assign the one or more units of voting power to the project;
   wherein the smart contract is executed in response to exceeding a voting threshold,
   wherein each of the one or more first servers, the one or more second servers, the one or more steward hardware nodes, the one or more auditor hardware nodes, the one or more project developer hardware nodes, and the one or more validator hardware nodes are communicatively coupled to each other via a communication network.

2. The decentralized system of claim 1, wherein each one of the one or more steward hardware nodes is further operable to: receive and store one or more first tokens from the one or more first servers; transmit one or more first tokens to the one or more second servers; and receive and store one or more second tokens from the one or more second servers in response to the transmission of the one or more first tokens to the one or more second servers.

3. The decentralized system of claim 1, wherein each one of the one or more auditor hardware nodes is further operable to: verify an identity associated with at least one steward wallet based at least in part on identity information provided by the one or more steward hardware nodes; and designate the verified one or more steward hardware nodes as one or more representative nodes.

4. The decentralized system of claim 3, wherein the one or more representative hardware nodes are operable to: assign one or more units of voting power associated with the one or more steward hardware nodes to the project.

5. The decentralized system of claim 1, further comprising one or more protocol developer hardware nodes operable to generate one or more software protocol changes to the decentralized system.

6. The decentralized system of claim 5, further comprising one or more governor hardware nodes operable to: propose one or more software protocol changes to the decentralized system; and send a request to the one or more protocol developer hardware nodes to generate the one or more software protocol changes based at least in part on a threshold consensus.

7. The decentralized system of claim 1, wherein the one or more first servers are operable to transmit one or more first tokens to one or more auditor wallets in response to the one or more auditor hardware nodes verifying the identity associated with the one or more project developer wallets or validating the credentials associated with the one or more project developer wallets.

8. The decentralized system of claim 1, wherein a quantity of the plurality of first tokens is minted based at least in part on one or more of an amount of greenhouse gases stored and an amount of energy produced.

9. The decentralized system of claim 1, wherein a quantity of one or more of the one or more first servers, the one or more second servers, the one or more steward hardware nodes, the one or more auditor hardware nodes, the one or more project developer hardware nodes, and the one or more validator hardware nodes is added to the decentralized system based at least in part on one or more of an amount of greenhouse gases stored and an amount of energy produced.

10. The decentralized system of claim 1, further comprising one or more private keys associated with one or more wallets, wherein the one or more private keys may be used to increase the cryptographic security of one or more of sending, receiving, and spending virtual tokens.